(12) United States Patent
Sawaqedy et al.

(10) Patent No.: US 11,454,347 B2
(45) Date of Patent: Sep. 27, 2022

(54) COLLAPSIBLE STAND AND COVER

(71) Applicants: Fadi Sawaqedy, Houston, TX (US); Shadi Nimri, Houston, TX (US)

(72) Inventors: Fadi Sawaqedy, Houston, TX (US); Shadi Nimri, Houston, TX (US)

(73) Assignee: TEXAS SMART SOLUTIONS, LLC, Houston, TX (US)

( * ) Notice: Subject to any disclaimer, the term of this patent is extended or adjusted under 35 U.S.C. 154(b) by 289 days.

(21) Appl. No.: 16/837,181

(22) Filed: Apr. 1, 2020

(65) Prior Publication Data
US 2021/0310600 A1 Oct. 7, 2021

(51) Int. Cl.
| | |
|---|---|
| *F16M 13/00* | (2006.01) |
| *A45C 13/10* | (2006.01) |
| *A45C 7/00* | (2006.01) |
| *A45C 11/00* | (2006.01) |

(52) U.S. Cl.
CPC ......... *F16M 13/00* (2013.01); *A45C 13/1069* (2013.01); *A45C 2007/0004* (2013.01); *A45C 2011/003* (2013.01); *A45C 2200/15* (2013.01); *F16M 2200/08* (2013.01)

(58) Field of Classification Search
CPC .......... A45C 2011/003; A45C 2200/15; A45C 2011/002; A45C 2007/0004; A47B 23/044; A47B 2220/0019; F16M 13/00; F16M 2200/08
See application file for complete search history.

(56) References Cited

U.S. PATENT DOCUMENTS

| | | | |
|---|---|---|---|
| 2,726,835 A | 12/1955 | Hummel | |
| 3,410,516 A | 11/1968 | Criswell | |
| 4,709,895 A * | 12/1987 | Mardak | A47B 23/044 248/459 |
| 4,722,504 A | 2/1988 | Degenholtz | |
| 4,991,812 A * | 2/1991 | MacEwan | A47B 19/08 248/459 |
| 8,424,830 B2 * | 4/2013 | Yang | A47B 23/044 248/459 |
| D690,305 S | 9/2013 | Wen | |
| D703,209 S | 4/2014 | Marcus | |
| 8,800,763 B2 | 8/2014 | Hale | |
| 8,833,554 B2 | 9/2014 | Busri | |

(Continued)

FOREIGN PATENT DOCUMENTS

WO 006717 A1 1/2004

*Primary Examiner* — Bradley Duckworth
(74) *Attorney, Agent, or Firm* — The Juhasz Law Firm

(57) ABSTRACT

Collapsible stand to support and exhibit an article includes a stand portion, two forward legs and a rear leg. The legs engage a lower portion of a main body and splay outwardly in the form of a tripod. The main body provides support against which the article rests in leaning engagement. The legs each include: a floor support panel hingeably connected to the main body to support the bottom of the article; an exterior support panel hingeably connected to the floor support panel and projecting from the floor to the main body to resist the opposing force created by the load of the article on the stand; a shelf panel hingeably connected to the exterior support panel to support the load of the article on the stand; and a shelf support panel hingeably connected to the shelf panel to support the shelf panel against the main body.

8 Claims, 39 Drawing Sheets

(56) References Cited

U.S. PATENT DOCUMENTS

| | | | |
|---|---|---|---|
| D715,802 S | 10/2014 | Connor | |
| 9,258,029 B2* | 2/2016 | Hu | A45C 11/00 |
| 9,308,767 B1* | 4/2016 | Waldron | B42D 15/042 |
| 9,310,835 B2* | 4/2016 | Bryan | G06F 1/1626 |
| 9,918,534 B2 | 3/2018 | Saila | |
| 9,918,545 B2* | 3/2018 | van Hooft | F16B 1/00 |
| 9,935,669 B1* | 4/2018 | Kuo | G06F 1/1626 |
| 10,211,874 B2 | 2/2019 | Kao et al. | |
| 10,485,312 B2 | 11/2019 | Rodriguez | |
| 10,606,314 B1* | 3/2020 | Takano | F16M 11/041 |
| 10,664,012 B1* | 5/2020 | Zimmerman | G06F 1/166 |
| 10,842,237 B2* | 11/2020 | Takano | A47B 23/044 |
| 10,935,182 B2* | 3/2021 | Lin | H05K 5/0234 |
| 11,076,665 B1* | 8/2021 | Greene | B65D 5/52 |
| 2002/0162935 A1* | 11/2002 | Hardy | F16M 11/38 |
| | | | 248/459 |
| 2008/0230672 A1* | 9/2008 | Pachowski | A47B 23/044 |
| | | | 248/459 |
| 2013/0270413 A1* | 10/2013 | Wilber | A47B 23/043 |
| | | | 248/558 |
| 2014/0076748 A1 | 3/2014 | Padilla | |
| 2016/0066667 A1* | 3/2016 | Yu | G06F 1/1628 |
| | | | 224/191 |
| 2017/0254471 A1* | 9/2017 | Wu | F16M 13/00 |
| 2020/0060420 A1* | 2/2020 | Hu | A47B 23/043 |
| 2020/0081489 A1* | 3/2020 | Stryker | G06F 1/1626 |
| 2020/0100375 A1* | 3/2020 | San Marzano | G06F 1/1632 |
| 2021/0207762 A1* | 7/2021 | He | F16M 11/38 |

* cited by examiner

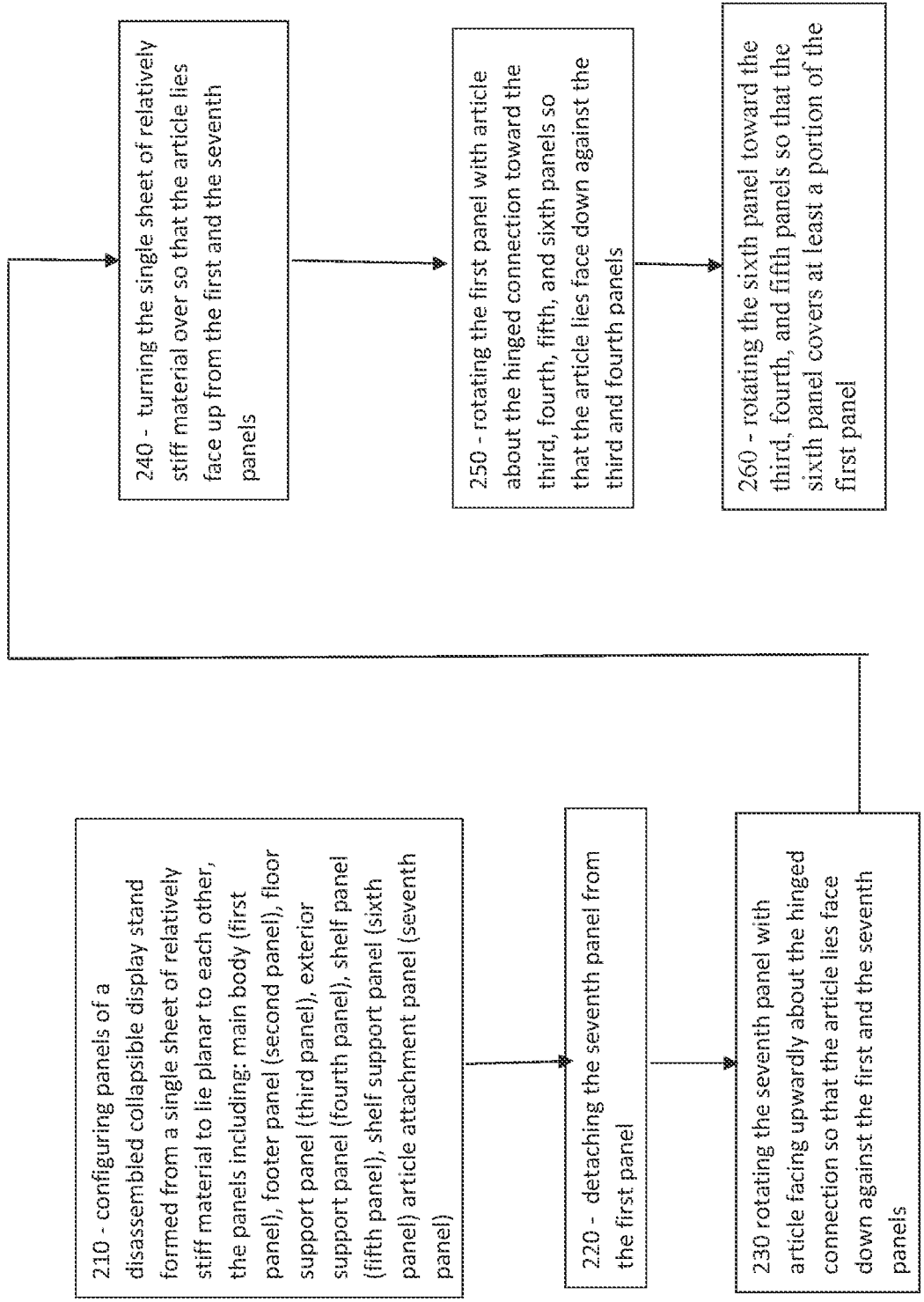

COLLAPSIBLE STAND AND COVER

FIELD OF INVENTION

This disclosure is directed to stand and covers and more particularly to a collapsible stand and method.

BACKGROUND

Collapsible stand and cover devices for articles such as electronic devices are well known. When the functionalities of providing an article stand and providing a cover for an article are integrated into a single device, they create tension between competing design criteria such as stability of the article (at an elevation with respect to the surface on which the stand may be placed), ease of assembly and collapse of the stand into a cover, ease of use of the cover, and so on.

There continues to be a need for improved balancing of these competing criteria in the design of collapsible stand and cover devices. This disclosure addresses that need.

SUMMARY

In one aspect, disclosed is a collapsible article stand configured in an assembled position to support and exhibit an article (at an elevation with respect to the surface on which the stand may be placed). The collapsible article stand includes a stand portion including at least two forward legs and at least a rear leg. The legs may be configured to engage a lower portion of a main body. The legs may splay outwardly in the form of a tripod. The main body may be configured to provide a support against which the article rests in leaning engagement. The legs may each include: (a) a floor support panel hingeably connected to the main body, the floor support panel configured to lie against the floor; (b) an exterior support panel hingeably connected to the floor support panel, the exterior support panel configured to project from the floor to the main body to resist the opposing force created by the load of the article supported by the collapsible stand; (c) a shelf panel hingeably connected to the exterior support panel configured to support the load of the article supported by the collapsible stand; and (d) a shelf support panel hingeably connected to the shelf panel configured to support the shelf panel against the main body.

In another aspect, a collapsible stand for supporting and exhibiting an article may include: a single sheet of relatively stiff material, the sheet weakened along a plurality of transverse parallel lines to provide a plurality of panels connected in hinged relation at their contiguous edges. A flap may be cut along a longitudinal mid-section of the sheet, the flap connected along one side in hinged relation to the single sheet, the flap forming a first leg of the stand. A portion of the sheet along a first longitudinal side of the cut-out of the flap may be configured to form a second leg of the stand. A portion of the sheet along a second longitudinal side of the cut-out of the flap may be configured to form a third leg of the stand. A portion of the sheet along an end of the cut-out of the flap may be configured to form a transverse support structure between the second leg and the third leg of the stand. A first panel of the plural-panel and shelf structure may be configured to provide a main body of the collapsible stand. A second panel of the single sheet of relatively stiff material may be configured to provide a footer panel of the collapsible stand, the footer panel hingedly connected to the first panel. A third panel of the single sheet of relatively stiff material may be configured to provide the floor support panel of the collapsible stand, the floor support panel hingedly connected to the footer panel. A fourth panel of the single sheet of relatively stiff material may be configured to provide the exterior support panel of the collapsible stand, the exterior support panel hingedly connected to the floor support panel. A sixth panel of the single sheet of relatively stiff material may be configured to provide the shelf support panel of the collapsible stand, the shelf support panel hingedly connected to the fifth panel. A seventh panel of the single sheet of relatively stiff material configured to provide an article attachment panel of the collapsible stand, the article attachment panel hingedly connected and releasably attached to the first panel. In an assembled position, the first leg of the stand may be further configured to provide a rear leg of the collapsible stand, and the second and third legs may be further configured to provide two forward legs of the collapsible stand.

In another aspect, a method for covering an article with a disassembled collapsible stand to which it is attached may include: (a) configuring panels of a disassembled collapsible stand formed from a single sheet of relatively stiff material to lie planar to each other, the panels including: a first panel of the plural-panel and shelf structure configured to provide a main body of the collapsible stand; a second panel of the single sheet of relatively stiff material configured to provide a footer panel of the collapsible stand, the footer panel hingedly connected to the first panel; a third panel of the single sheet of relatively stiff material configured to provide the floor support panel of the collapsible stand, the floor support panel hingedly connected to the footer panel; a fourth panel of the single sheet of relatively stiff material configured to provide the exterior support panel of the collapsible stand, the exterior support panel hingedly connected to the floor support panel; a sixth panel of the single sheet of relatively stiff material configured to provide the shelf support panel of the collapsible stand, the shelf support panel hingedly connected to the fifth panel; a seventh panel of the single sheet of relatively stiff material configured to provide an article attachment panel of the collapsible stand, the article attachment panel hingedly connected and releasably attached to the first panel; (b) detaching the seventh panel from the first panel; (c) rotating the seventh panel with article facing upwardly about the hinged connection so that the article lies face down against the first and the seventh panels; (d) turning the single sheet of relatively stiff material over so that the article lies face up from the first and the seventh panels; (e) rotating the first panel with article about the hinged connection toward the third, fourth, fifth, and sixth panels so that the article lies face down against the third and fourth panels; and (f) rotating the sixth panel toward the third, fourth, and fifth panels so that the sixth panel covers at least a portion of the first panel to complete the covering of the article.

DESCRIPTION OF DRAWINGS

FIG. 39 depicts an illustrative method for covering an article after disassembly of the collapsible stand.

DETAILED DESCRIPTION

Figure 1:
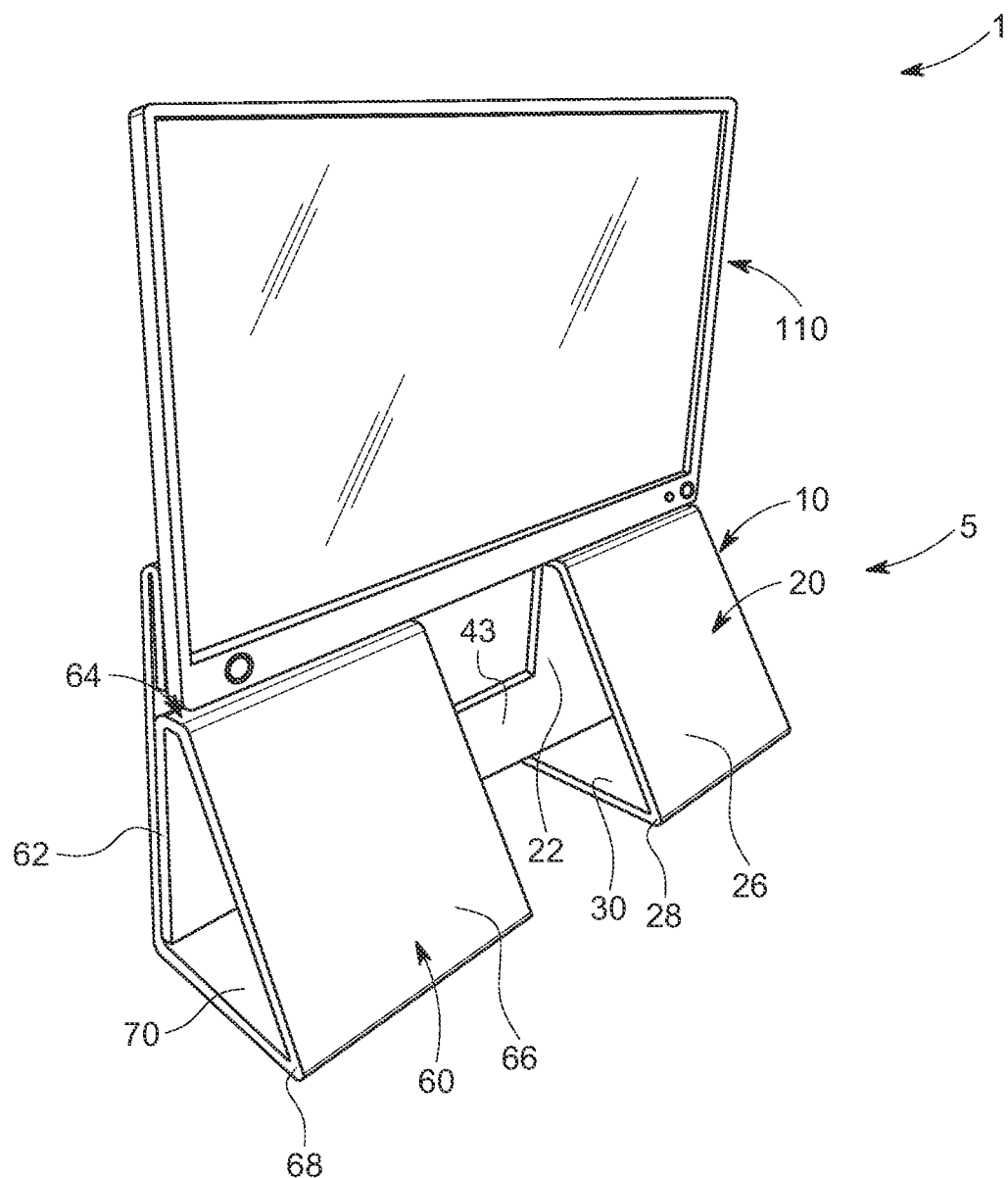
FIG. 1 is a front side perspective view of an illustrative embodiment of an assembled stand according to this disclosure.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Broadly speaking, a collapsible stand to support and exhibit an article includes a stand portion including at least two forward legs and at least a rear leg. The legs engage a lower portion of a main body and splay outwardly in the form of a tripod. The main body provides a support against which the article rests in leaning engagement. The legs each include: (a) a floor support panel hingeably connected to the main body configured to support the bottom of the article; (b) an exterior support panel hingeably connected to the floor support panel and projecting from the floor to the main body to resist the opposing force created by the load of the article on the stand; (c) a shelf panel hingeably connected to the exterior support panel configured to support the load of the article on the stand; and (d) a shelf support panel hingeably connected to the shelf panel configured to support the shelf panel against the main body.

In another aspect, the collapsible stand may be used in combination with an article, wherein the article is an electronic device. The electronic device may be a computing device. In another aspect, the computing device may be a laptop computer. In another aspect, the computing device may be a laptop computer.

The collapsible stand of this disclosure may be suitable for application with a variety of different types of devices, such as portable and mobile devices, for example, in lap upper computers, iPad, tablet computers, game consoles or game controllers, various wearable devices, etc.

Figure 2:
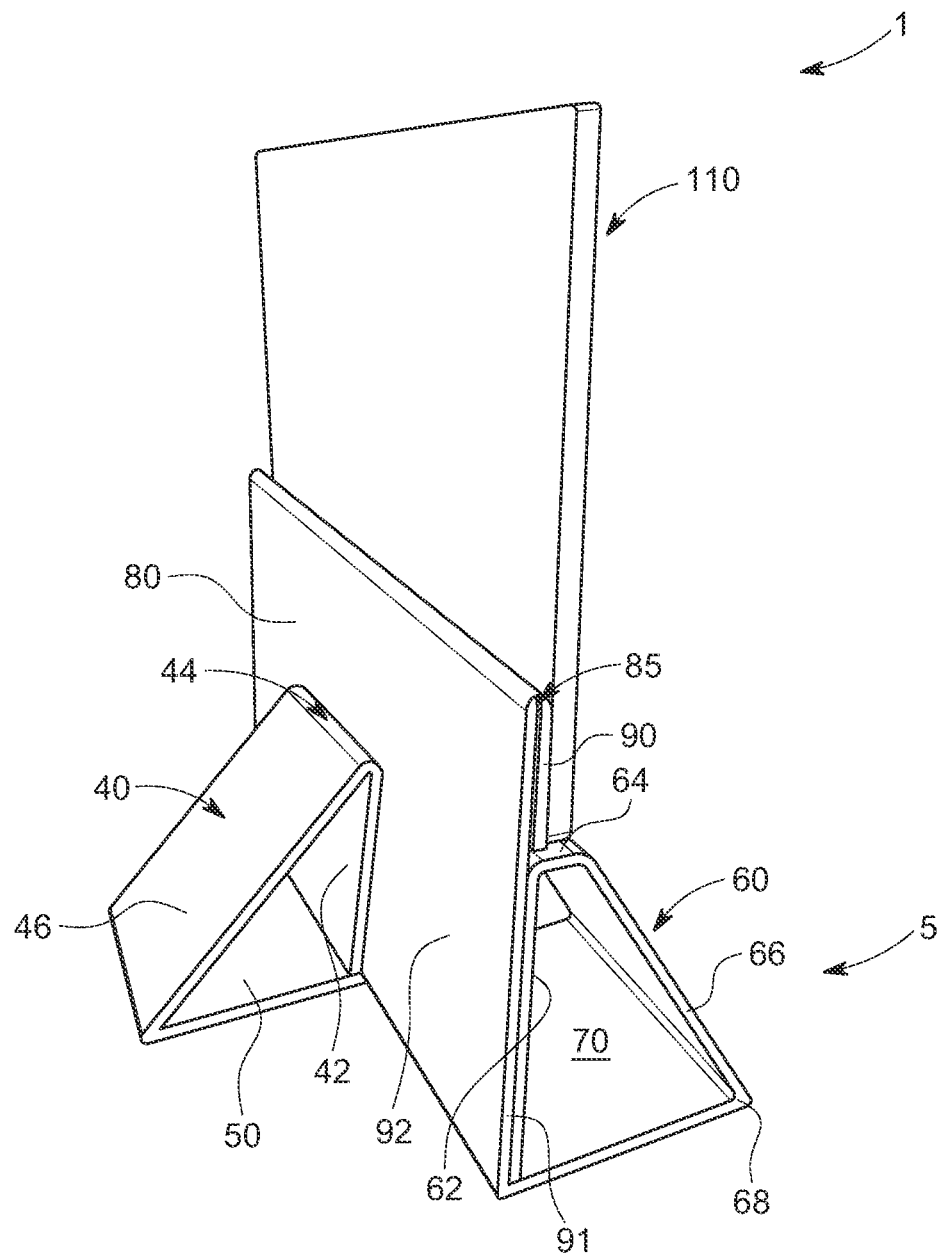
FIG. 2 is a back side perspective view of an illustrative embodiment of an assembled stand according to this disclosure.

FIGS. 1 through 7 disclose a collapsible stand configured in an assembled position to steadily support and exhibit an article at an elevation with respect to the ground (e.g., a surface on which the collapsible stand may be placed. FIG. 1 depicts a front side perspective view of an illustrative embodiment of an assembled stand according to this disclosure. FIG. 2 depicts a back side perspective view of an illustrative embodiment of an assembled stand according to this disclosure.

Figure 3:
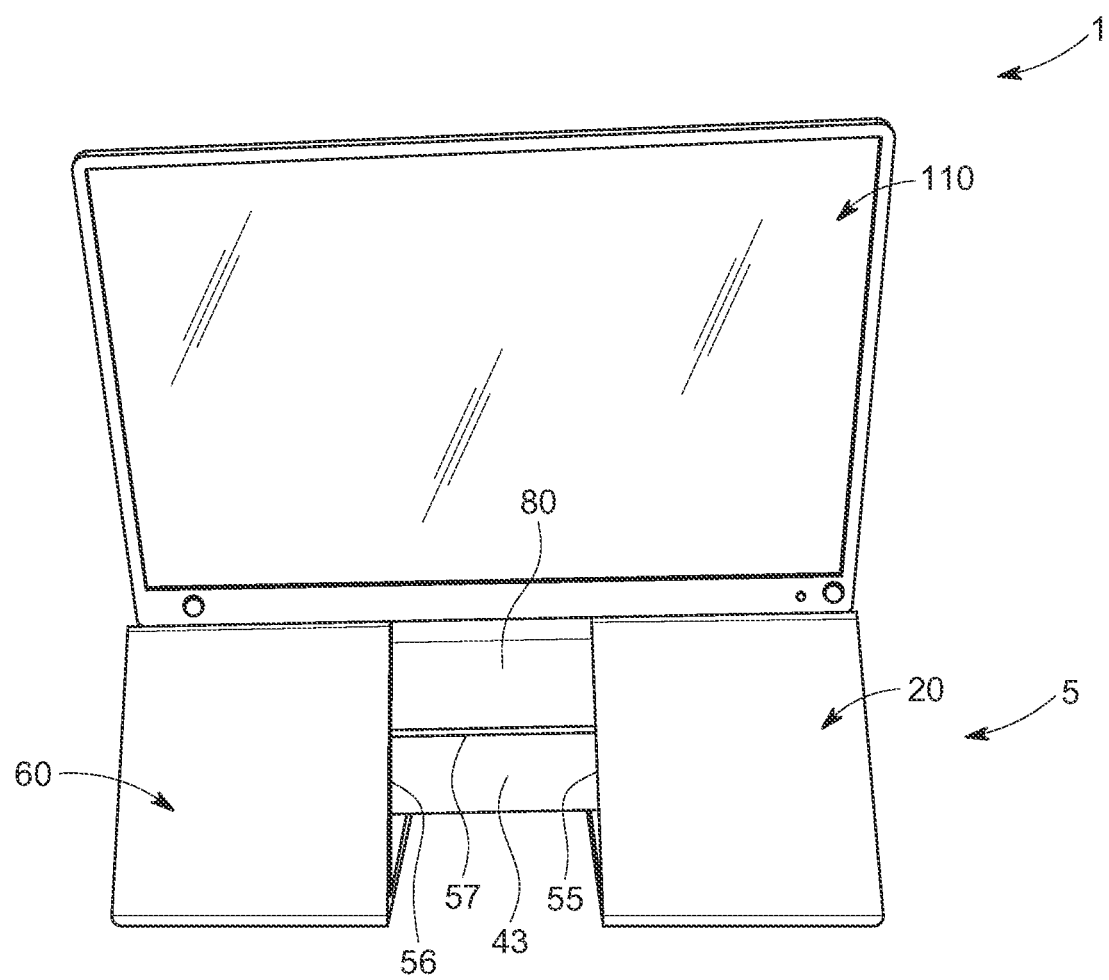
FIG. 3 is a front view of an illustrative embodiment of an assembled stand according to this disclosure.
Figure 4:
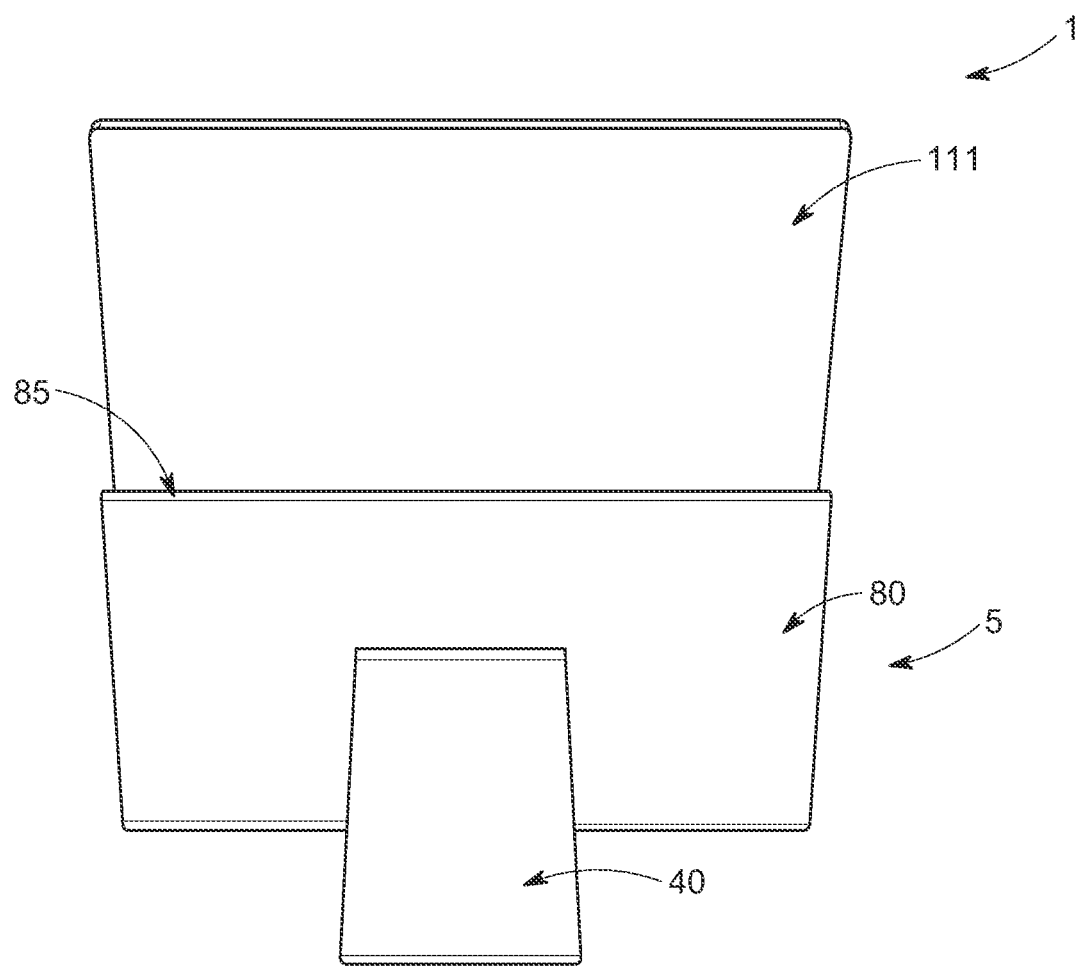
FIG. 4 is a back view of an illustrative embodiment of an assembled stand according to this disclosure.
Figure 5:
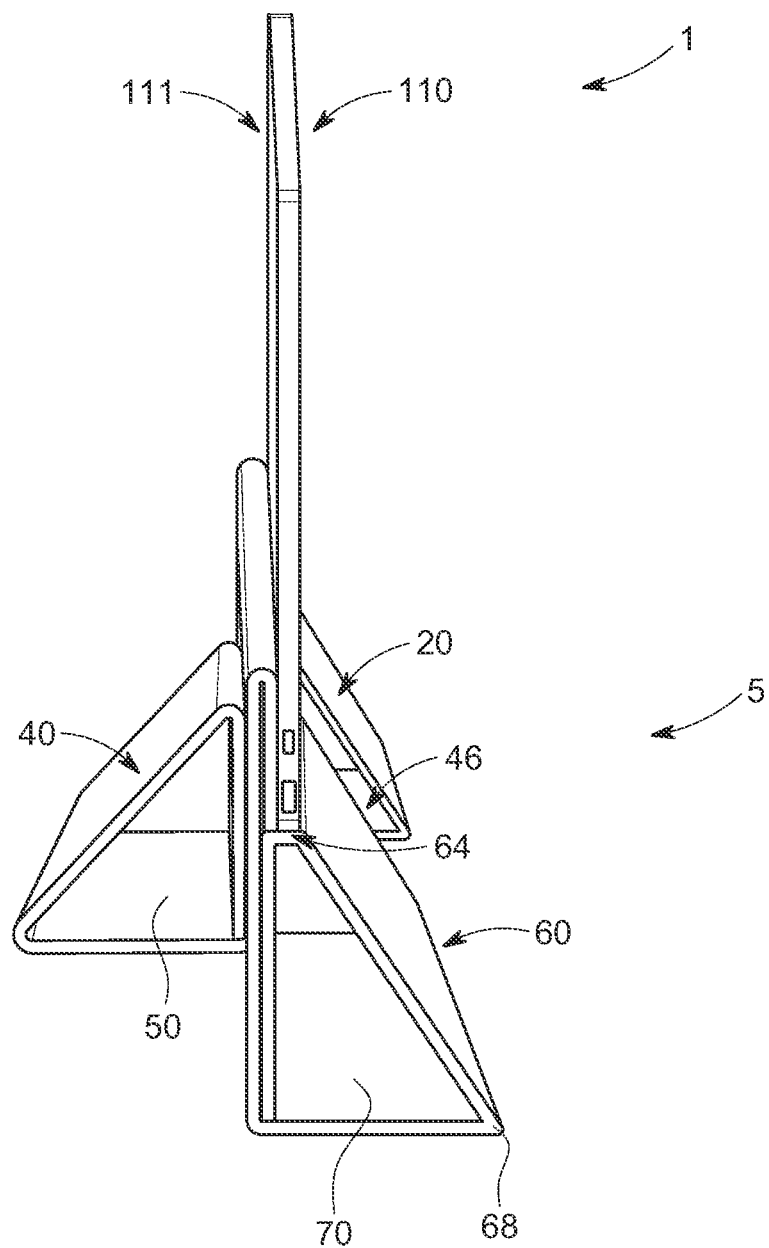
FIG. 5 is a side perspective view of an illustrative embodiment of an assembled stand according to this disclosure.
Figure 6:
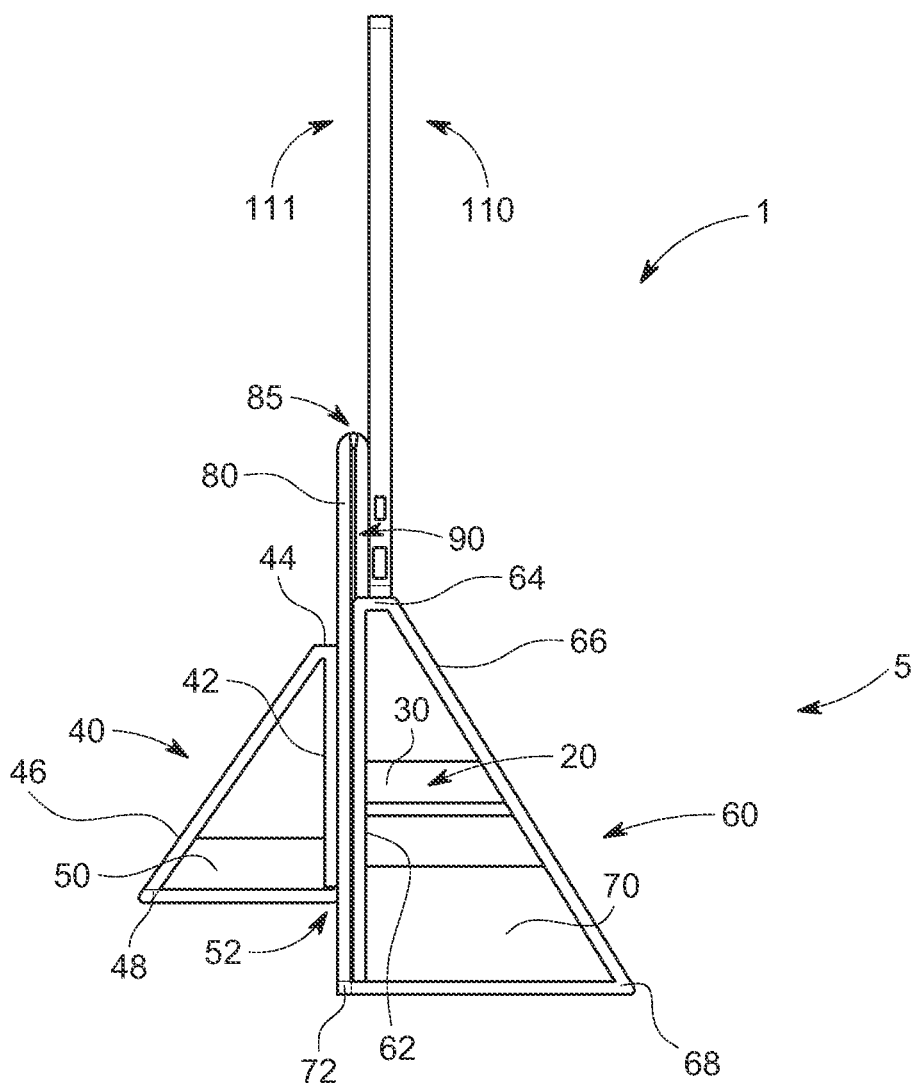
FIG. 6 is a side view of an illustrative embodiment of an assembled stand according to this disclosure.
Figure 7:
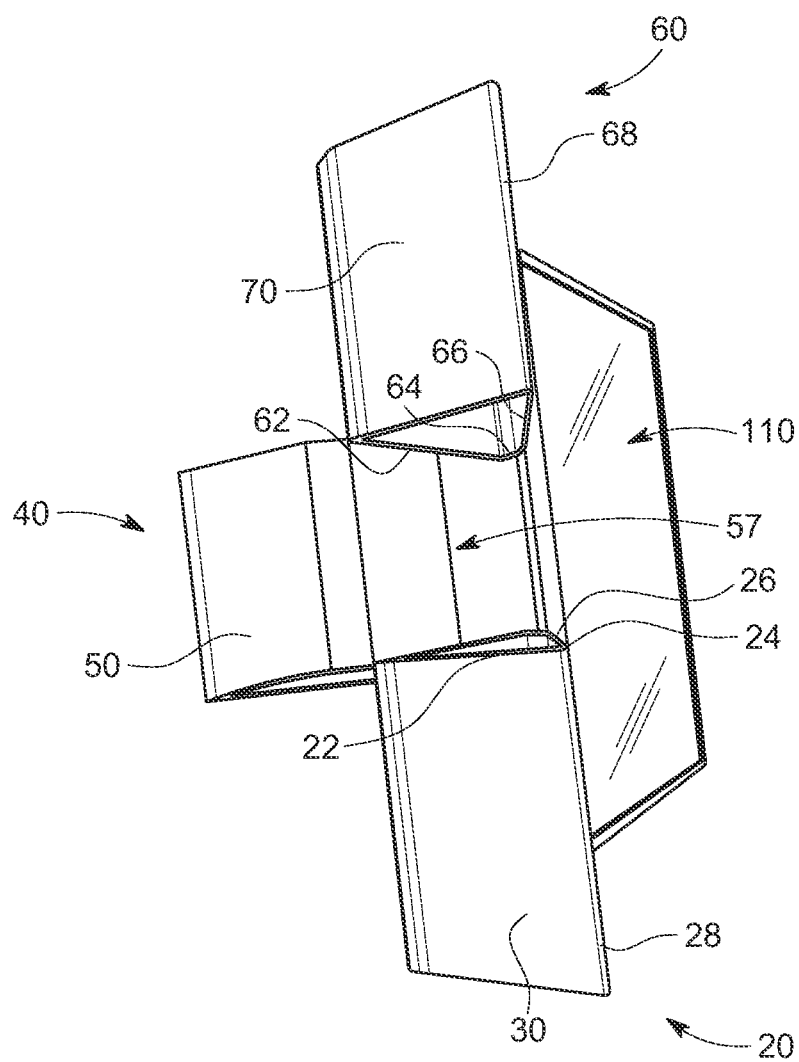
FIG. 7 is a bottom perspective view of an illustrative embodiment of an assembled stand according to this disclosure.

FIG. 3 depicts a front view of an illustrative embodiment of an assembled stand according to this disclosure. FIG. 4 depicts a back view of an illustrative embodiment of an assembled stand according to this disclosure. FIG. 5 depicts a side perspective view of an illustrative embodiment of an assembled stand according to this disclosure. FIG. 6 depicts a side view of an illustrative embodiment of an assembled stand according to this disclosure. FIG. 7 depicts a bottom perspective view of an illustrative embodiment of an assembled stand according to this disclosure.

More specifically, FIGS. 1-7 depict a collapsible stand 1 configured in an assembled position to steadily support and exhibit an article. The collapsible stand 1 includes a collapsible stand portion 5 including two forward legs 60, 20 (e.g., FIG. 1), and a rear leg 40 (e.g., FIG. 2). The legs may be configured to engage a lower portion 91, 92 of a main body 80 (e.g., FIG. 2 showing the engagement of forward leg 60 and rear leg 40). The legs may splay outwardly in the form of a tripod. The main body 80 may be configured to provide a support against which the article 110 rests in leaning engagement. [As used herein, article 110 indicates the front side of the article and article 111 the back side.] As depicted in FIG. 6, the legs may each include: (a) a floor support panel 30, 50, 70 hingeably connected 32, 52, 72 to the main body 80, the floor support panel 30, 50, 70 configured to support the bottom of the article; (b) an exterior support panel 26, 46, 66 hingeably connected 28, 48, 68 to the floor support panel 30, 50, 70, the exterior support panel 26, 46, 66 configured to project from the floor to the main body 80 to resist the opposing force created by the load of the article 110 supported by the collapsible stand portion 5; (c) a shelf panel 24, 44, 64 hingeably connected to the exterior support panel 26, 46, 66 configured to support the load of the article 110 supported by the collapsible stand portion 5; and (d) a shelf support panel 22, 42, 62 hingeably connected to the shelf panel 24, 44, 64 configured to support the shelf panel against the main body.

Figure 8:
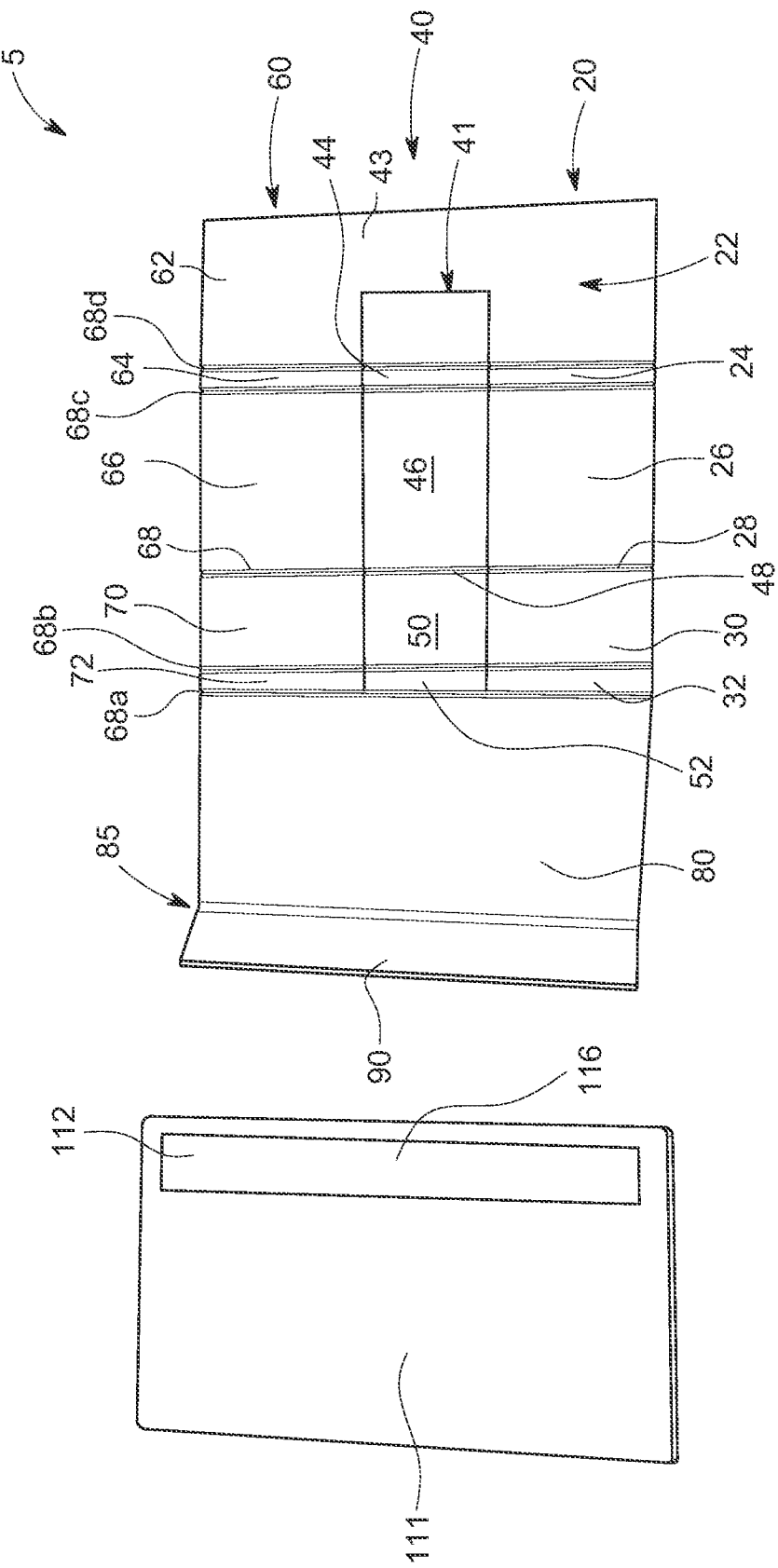
FIG. 8 is a plan view of an illustrative embodiment of a back side of a disassembled stand according to this disclosure.
Figure 9:
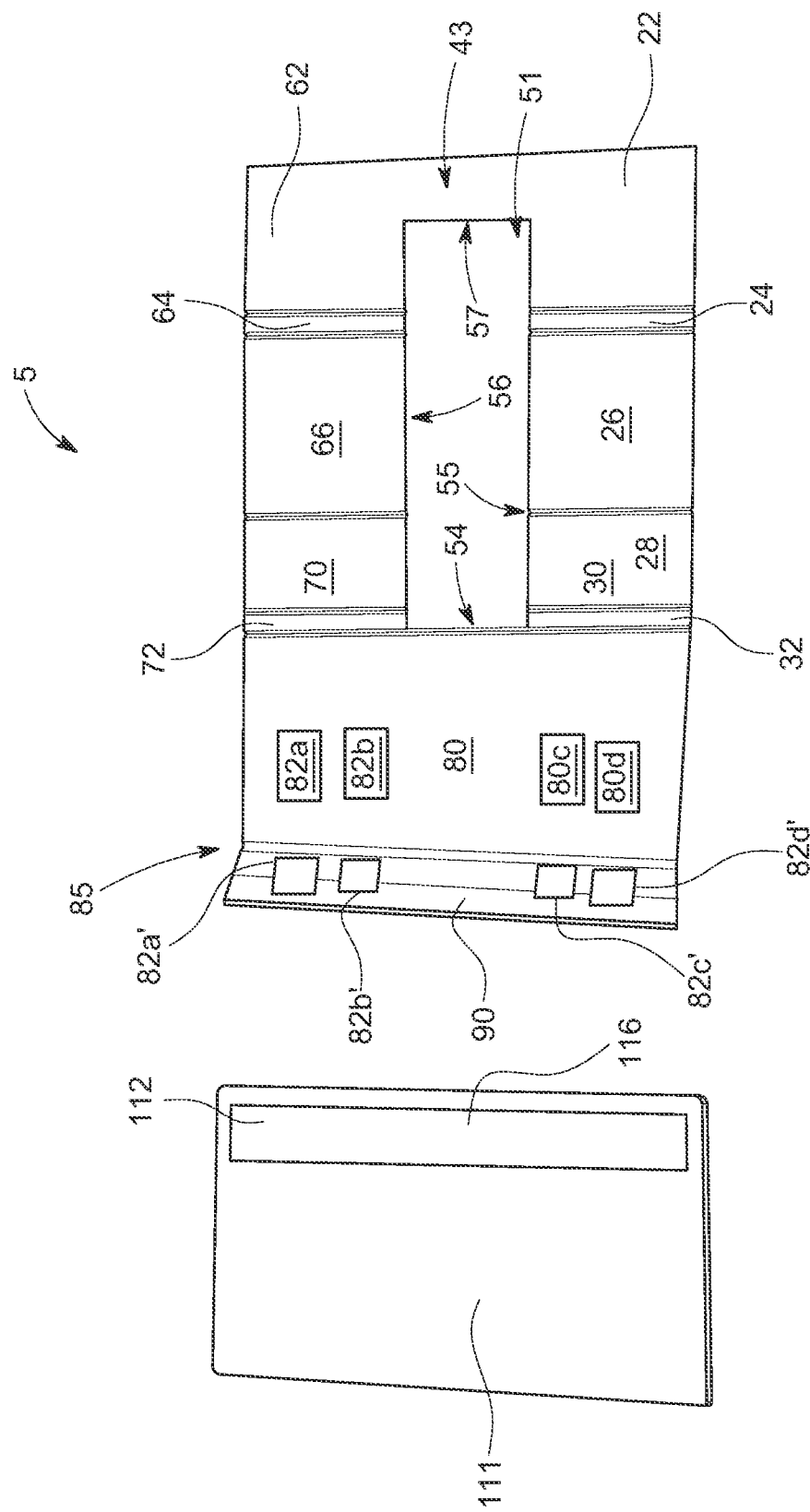
FIG. 9 is a plan view of an illustrative embodiment of a back side of a disassembled stand according to this disclosure.

FIGS. 8 and 9 depict an illustrative embodiment a disassembled stand according to this disclosure. FIG. 8 depicts a plan view of an illustrative embodiment of a back side of a disassembled stand according to this disclosure with article 111 (i.e., the backside of article 110) depicted separated from the disassembled stand 5 along the side of the stand 5 where the article is to be attached.

FIG. 9 is a plan view of an illustrative embodiment of a back side of a disassembled stand according to this disclosure of FIG. 8 with a slight change in depiction as explained below.

Figure 10:
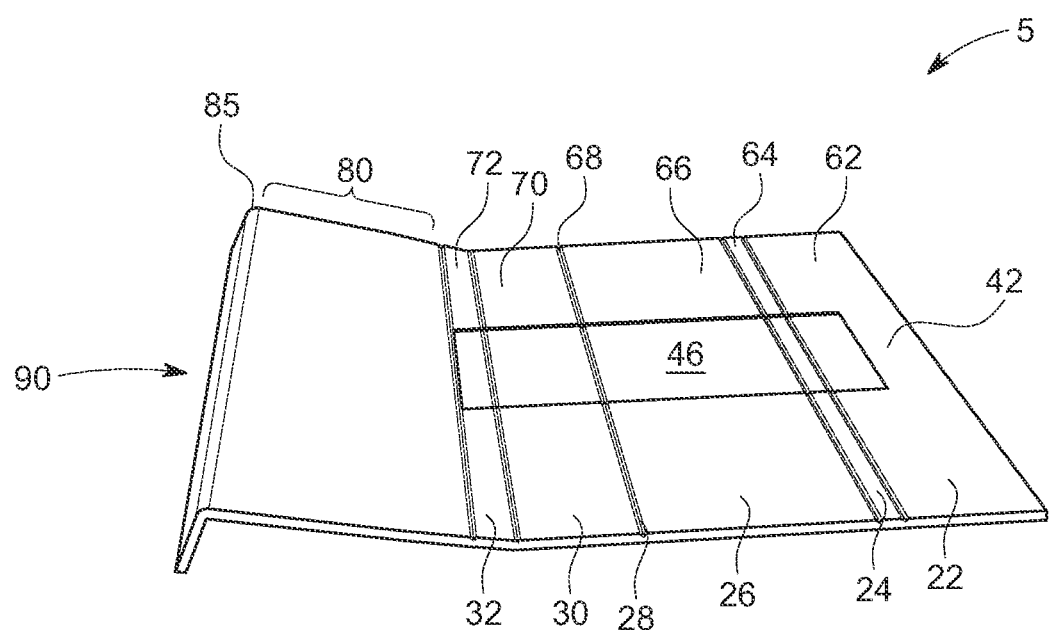
FIG. 10 is a perspective view of an illustrative embodiment of a front side of a disassembled stand according to this disclosure.

FIG. 10 depicts a perspective view of a front side of a disassembled illustrative stand 5 according to this disclosure.

As shown in FIGS. 8, 9 and 10, in a disassembled position, the legs 20, 40, 60 and main body 80 may collapse into a single sheet of relatively stiff material that may be used for the collapsible stand portion 5, the sheet weakened along a plurality of transverse parallel lines to provide a plurality of panels connected in hinged relation at their contiguous edges to provide the legs and main body in the assembled position as shown.

The single sheet of relatively stiff material forming collapsible stand portion 5 may include a flap 41 cut out along a longitudinal mid-section of the sheet, the flap 41 connected along one side 54 in hinged relation to the main body 80, the flap 41 leaving a flap cut-out 51 when the flap is folded away from the plane of the single sheet of relatively stiff material that may be used for the collapsible stand portion 5, the flap 41 configured to form at least a part of the rear leg 40 of the collapsible stand 1.

A portion of the single sheet of relatively stiff material that may be used for the collapsible stand portion 5 along a first longitudinal side 55 of the flap cutout 51 is configured to form at least a part of a first 20 of the two forward legs 20, 60. A portion of the single sheet of relatively stiff material that may be used for the collapsible stand portion 5 along a second longitudinal side 56 of the flap cutout 51 may be configured to form a second 60 of the two forward legs 20, 60.

A portion of the sheet along transverse side 57 of the end of the flap cutout 51 may be configured to form a transverse support structure 43 between the two forward legs 20, 60.

The plurality of panels may include a first panel 80 of the single sheet of relatively stiff material configured to provide the main body 80 of the collapsible stand.

The plurality of panels may include a second panel 32, 52, 72 of the single sheet of relatively stiff material configured to provide a footer panel 32, 52, 72 of the collapsible stand 5, the footer panel hingedly connected 68a to the first panel 80.

The plurality of panels may include a third panel 30, 50, 70 of the single sheet of relatively stiff material configured to provide the floor support panel 30, 50, 70 of the collapsible stand 5, the floor support panel 30, 50, 70 hingedly connected 68b to the footer panel 32, 52, 72.

The plurality of panels may include a fourth panel 26, 46, 66 of the single sheet of relatively stiff material configured to provide the exterior support panel 26, 46, 66 of the collapsible stand 5, the exterior support panel 26, 46, 66 hingedly connected 68 to the floor support panel 30, 50, 70.

The plurality of panels may include a fifth panel 24, 44, 64 of the single sheet of relatively stiff material configured to provide the shelf panel 24, 44, 64 of the collapsible stand, the shelf panel hingedly connected 68c to the fourth panel 26, 46, 66.

The plurality of panels may include a sixth panel 22, 42, 62 of the single sheet of relatively stiff material configured to provide the shelf support panel 22, 42, 62 of the collapsible stand 5, the shelf support panel 22, 42, 62 hingedly connected 68d to the fifth panel 24, 44, 64.

The plurality of panels may include a seventh panel 90 of the single sheet of relatively stiff material configured to provide an article attachment panel 90 of the collapsible stand 5, the article attachment panel hingedly connected 85 and releasably attached to the first panel 80 as explained below.

As shown in FIG. 9, the mechanism for releasably attaching the seventh panel to the first panel may include a pair of opposite polarity magnets disposed along adjacent surfaces of both the first and seventh panels.

More specifically, the mechanism for releasably attaching the seventh panel to the first panel may include one or more magnets of a first polarity 82a', 82b', 82c', 82d' secured to a back side of the seventh panel 90 and one or more magnets of a polarity opposite to the first polarity 82a, 82b, 82c, 82d secured to the front side of the main body 80, the one or more magnets of a first polarity 82a', 82b', 82c', 82d' and the one or more magnets of a polarity opposite to the first polarity 82a, 82b, 82c, 82d configured to releasably attach to each other when the seventh panel 90 and the first panel 80 are disposed in adjacent proximity to each other.

Figure 11:
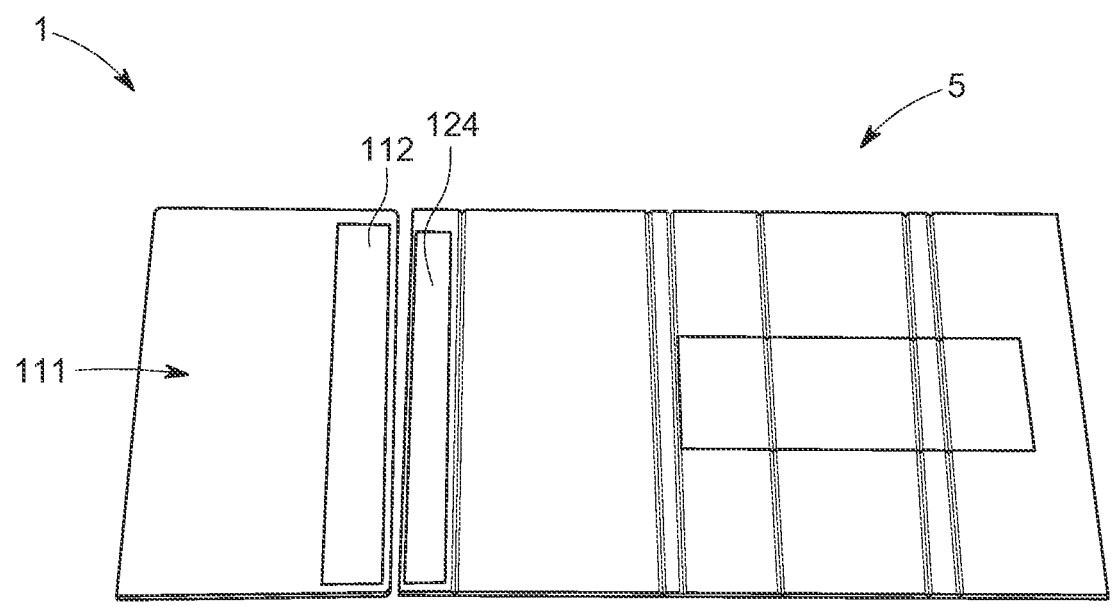
FIG. 11 is a perspective view of an illustrative embodiment of a back side of a disassembled stand according to this disclosure.

FIG. 11 is a plan perspective view of an illustrative embodiment of a back side of a disassembled stand according to this disclosure. As shown in FIGS. 8, 9, and 11, the mechanism for releasably attaching an article 111 to the seventh panel may include a Velcro® hook or fastener connector provided on the article 111 and a Velcro® fastener or hook fastener connector provided on the seventh panel, the Velcro® hook or fastener connector of the article configured to releasably attach to the Velcro® fastener or hook connector of the seventh panel when the article and the seventh panel are disposed in adjacent proximity to each other.

More specifically, the seventh panel of the single sheet of relatively stiff material may further include a mechanism configured for releasably attaching the article to the seventh panel. In FIG. 11, the mechanism for releasably attaching the article to the seventh panel may include a Velcro® hook or fastener connector 124 on the seventh panel, the Velcro® hook or fastener connector configured to releasably attach to a Velcro® fastener or hook connector on the article when the article and the seventh panel are disposed in adjacent proximity to each other.

Even more specifically, and as shown in FIGS. 8, 9 and 11, the article may be releasably attached to the seventh panel by a mechanism on a back side of the article. The attachment mechanism is shown in FIG. 11 as Velcro® hook or fastener connector 112. Velcro® hook or fastener connector 112 is configured for releasably attaching the article 111 to the Velcro® hook or fastener connector 124 on the seventh panel. The number, positioning, and type of mechanisms to attach the article 111 to the collapsible stand are a matter of design choice.

Figure 12:
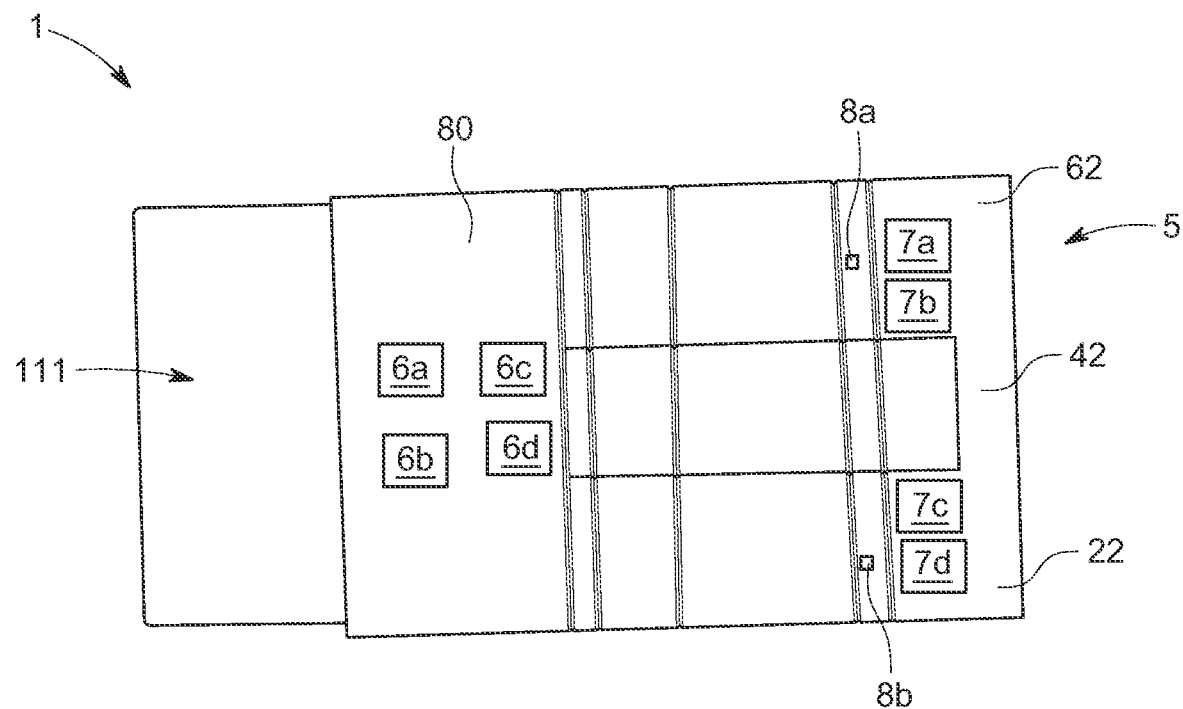
FIG. 12 is a plan view of an illustrative embodiment of a back side of a disassembled stand according to this disclosure.
Figure 13:
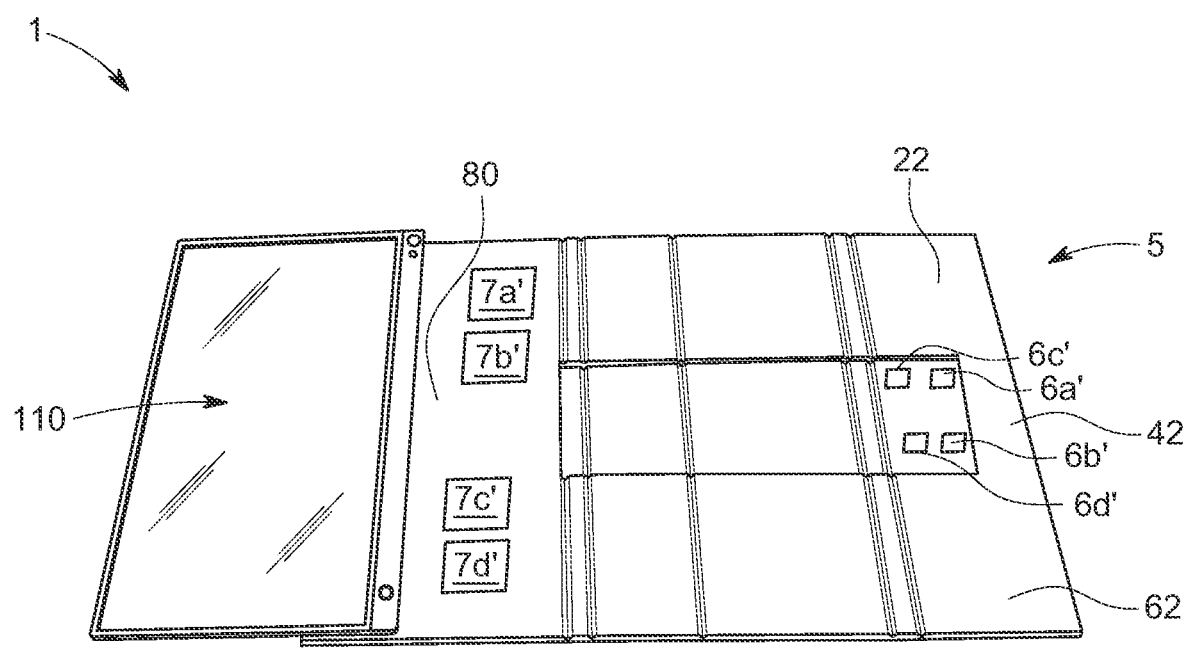
FIG. 13 is a perspective view of an illustrative embodiment of a front side of a disassembled stand according to this disclosure.

FIG. 12 depicts a plan view of an illustrative embodiment of a back side of a disassembled collapsible stand 5 according to this disclosure. FIG. 13 is a perspective view of an illustrative embodiment of a front side of a disassembled collapsible stand 5 according to this disclosure.

FIG. 12 depicts the back side of the sixth panel 22, 42, 62 of the single sheet of relatively stiff material which may further include a mechanism for releasably attaching the sixth panel 22, 42, 62 of the front and rear legs to the first panel 80 when the collapsible collapsible stand 5 is in an assembled position.

More specifically, the mechanism for releasably attaching the sixth panel 22 and 62 of rear legs to the first panel 80 may include one or more magnets of a first polarity 7a, 7b, 7c, 7d secured to a back side of the sixth panel 22 and 62 (FIG. 12) and one or more magnets of a polarity opposite to the first polarity 7a', 7b', 7c', 7d' secured to the front side of the main body 80 (FIG. 13), the one or more magnets of a first polarity 7a, 7b, 7c, 7d and the one or more magnets of a polarity opposite to the first polarity 7a', 7b', 7c', 7d' configured to releasably attach to each other when the sixth panel 22, 62 and the first panel 80 are disposed in adjacent proximity to each other.

Similarly, the mechanism for releasably attaching the sixth panel 42 of front leg to the first panel 80 may include one or more magnets of a first polarity 6a', 6b', 6c', 6d' secured to a front side of the sixth panel 22 and 62 (FIG. 13) and one or more magnets of a polarity opposite to the first polarity 6a, 6b, 6c, 6d secured to the back side of the main body 80, the one or more magnets of a first polarity 6a', 6b', 6c', 6d' and the one or more magnets of a polarity opposite to the first polarity 6a, 6b, 6c, 6d configured to releasably attach to each other when the sixth panel 42 and the first panel 80 are disposed in adjacent proximity to each other.

As explained in connection with FIGS. 1-13, a collapsible stand 5 for supporting and exhibiting an article 110 may include: a single sheet of relatively stiff material forming the collapsible stand 5, the sheet weakened along a plurality of transverse parallel lines to provide a plurality of panels connected in hinged relation at their contiguous edges. A flap 41 may be cut along a longitudinal mid-section of the sheet, the flap connected along one side 54 in hinged relation to the single sheet, the flap 41 forming at least a part of a first leg 40 of the stand.

A portion of the sheet of relatively stiff material forming the collapsible stand 5 along a first longitudinal side 54 of the flap cut-out 51 may be configured to form a second leg 20 of the collapsible stand 5. A portion of the sheet along a second longitudinal side 56 of the flap cut-out 51 may be configured to form a third leg 60 of the collapsible stand 5. A portion of the sheet along an end 57 of the flap cut-out 51 may be configured to form a transverse support structure 43 between the second leg 20 and the third leg 60 of the stand.

A first panel 80 of the plural-panel and shelf structure may be configured to provide a main body 80 of the collapsible stand 5. A second panel 32, 52, 72 of the single sheet of relatively stiff material may be configured to provide a footer panel 32, 52, 72 of the collapsible stand 5, the footer panel 32, 42, 72 hingedly connected 68a to the first panel 80. A third panel 30, 40, 50 of the single sheet of relatively stiff material may be configured to provide the floor support panel 30, 50, 70 of the collapsible stand 5, the floor support panel 30, 50, 70 hingedly connected 68b to the footer panel 32, 52, 72. A fourth panel 26, 46, 66 of the single sheet of relatively stiff material may be configured to provide the exterior support panel 26, 46, 66 of the collapsible stand 5, the exterior support panel 26, 46, 66 hingedly connected 28, 48, 68 to the floor support panel 30, 50, 70. A fifth panel 24, 44, 64 of the single sheet of relatively stiff material configured to provide the shelf panel 24, 44, 64 of the collapsible stand 5, the shelf panel 24, 44, 64 hingedly connected 68c to the fourth panel 26, 46, 66. A sixth panel 22, 42, 62 of the single sheet of relatively stiff material may be configured to provide the shelf support panel 22, 42 62 of the collapsible stand 5, the shelf support panel 22, 42, 62 hingedly connected 68d to the fifth panel 24, 44, 64. A seventh panel 90 of the single sheet of relatively stiff material may be configured to provide an article attachment panel of the collapsible stand 5, the article attachment panel hingedly connected 85 and releasably attached to the first panel 80.

As also explained, in an assembled position, the first leg 40 of the stand may be further configured to provide a rear leg 40 of the collapsible stand 5, and the second and third legs 20, 60 may be further configured to provide two forward legs of the collapsible stand.

Figure 14:
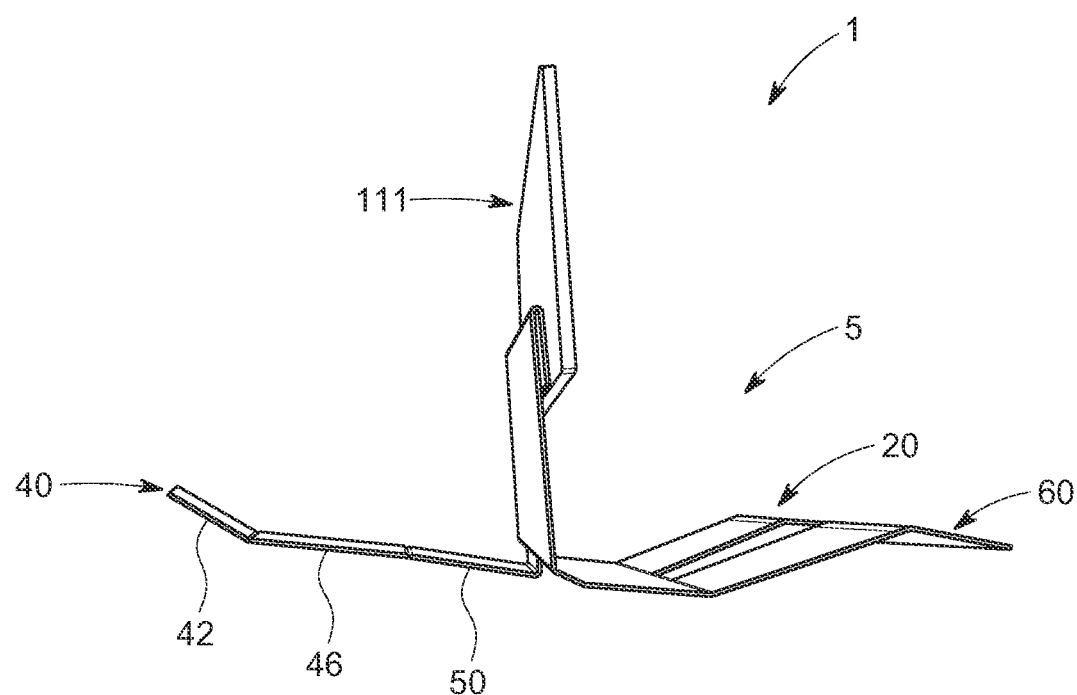
FIG. 14 is a perspective view of an illustrative embodiment of a side of a disassembled stand according to this disclosure.
Figure 15:
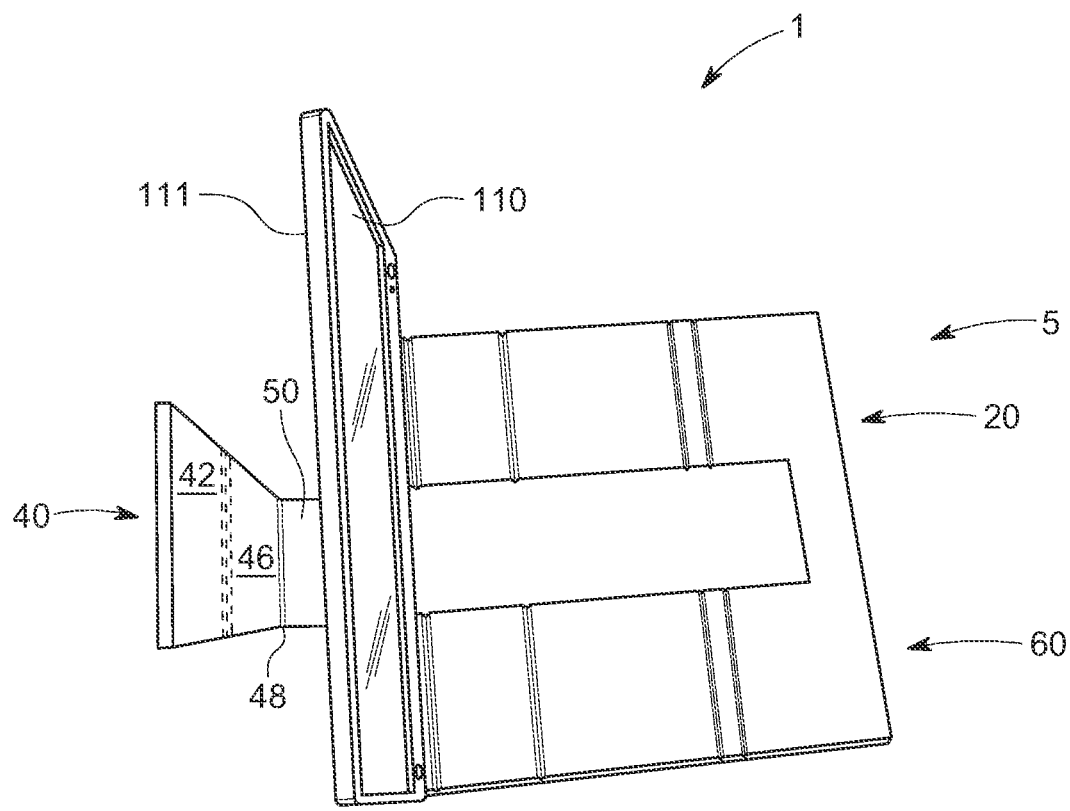
FIG. 15 is a perspective view of an illustrative embodiment of a top side of a disassembled stand according to this disclosure.
Figure 16:
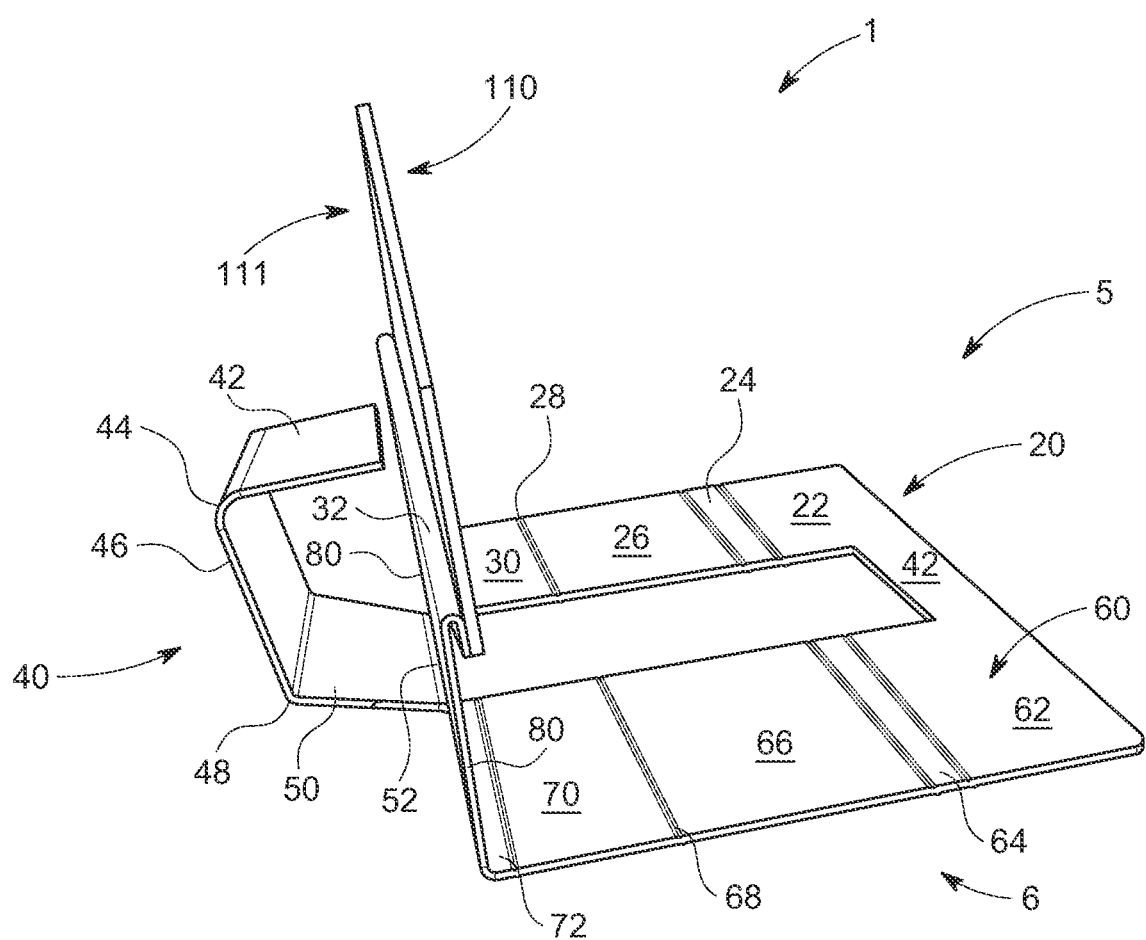
FIG. 16 is a perspective view of an illustrative embodiment of a side of a disassembled stand according to this disclosure.
Figure 17:
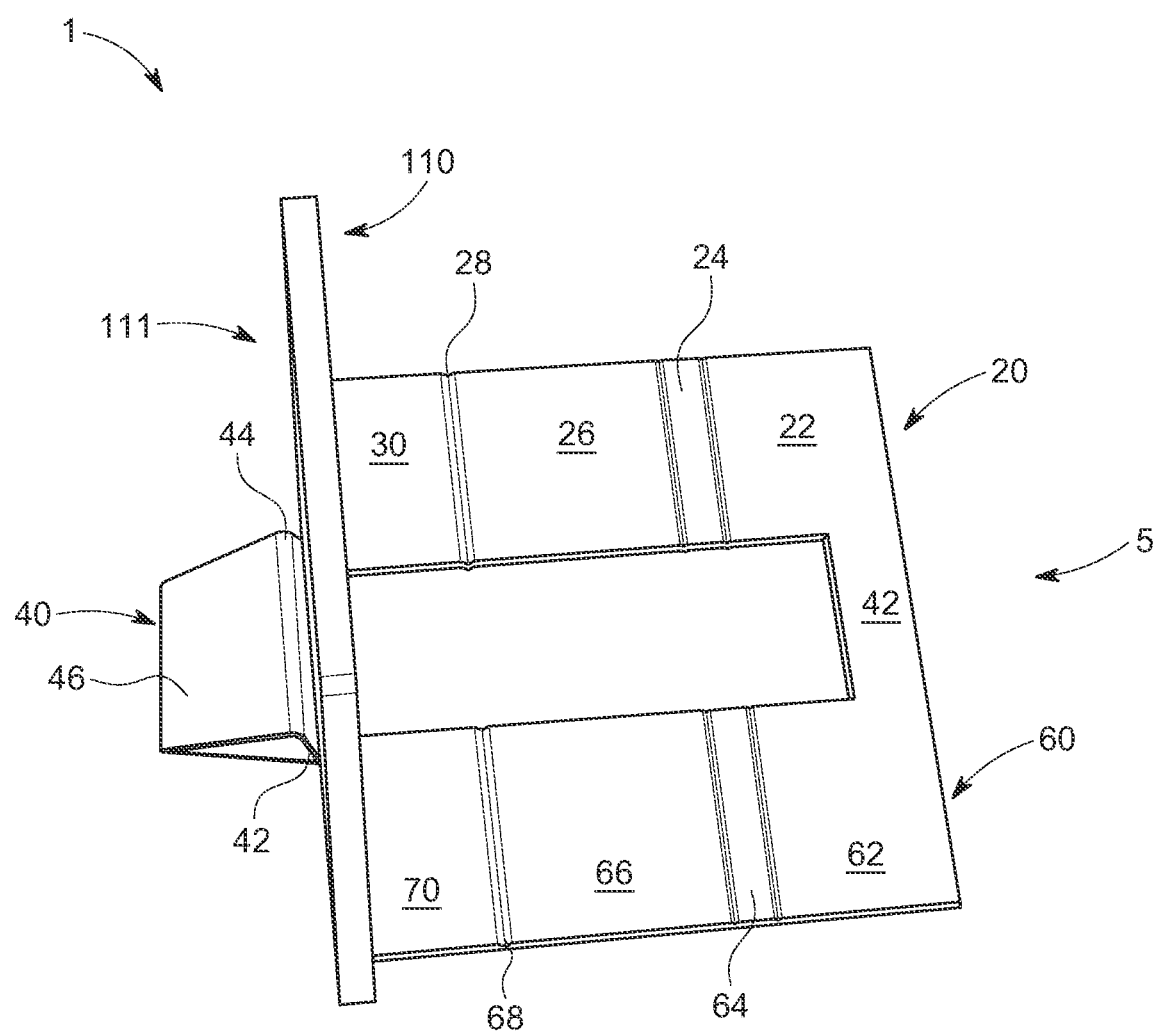
FIG. 17 is a perspective view of an illustrative embodiment of a top side of a disassembled stand according to this disclosure.
Figure 18:
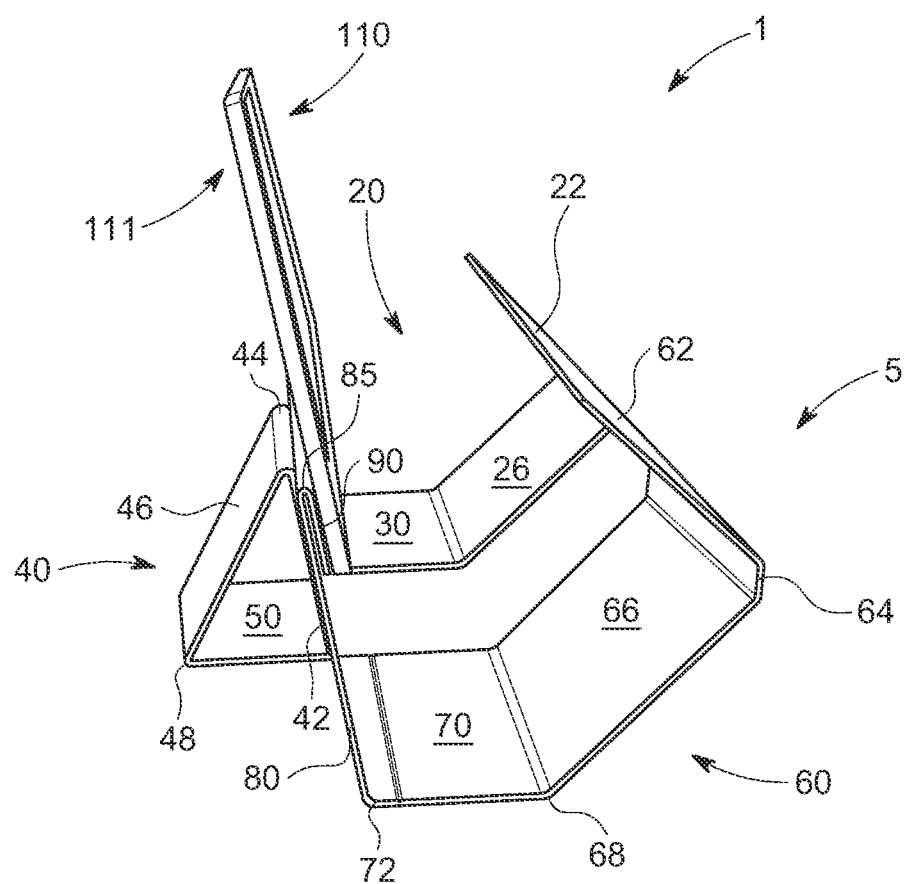
FIG. 18 is a perspective view of an illustrative embodiment of a side of a disassembled stand according to this disclosure.
Figure 19:
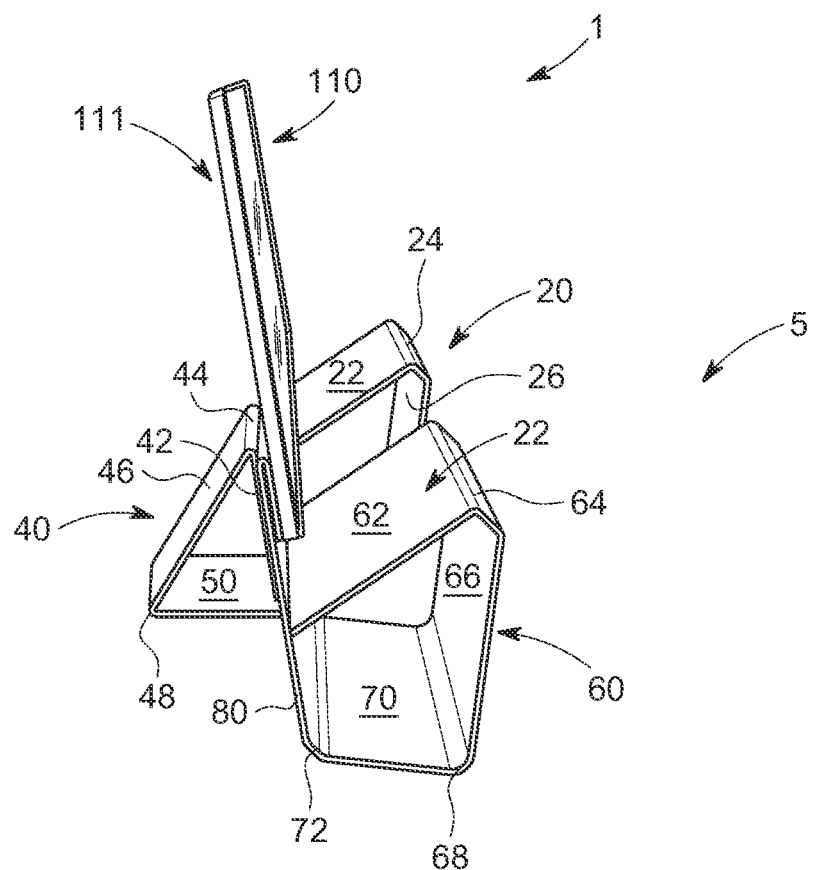
FIG. 19 is a perspective view of an illustrative embodiment of a side of a disassembled stand according to this disclosure.
Figure 20:
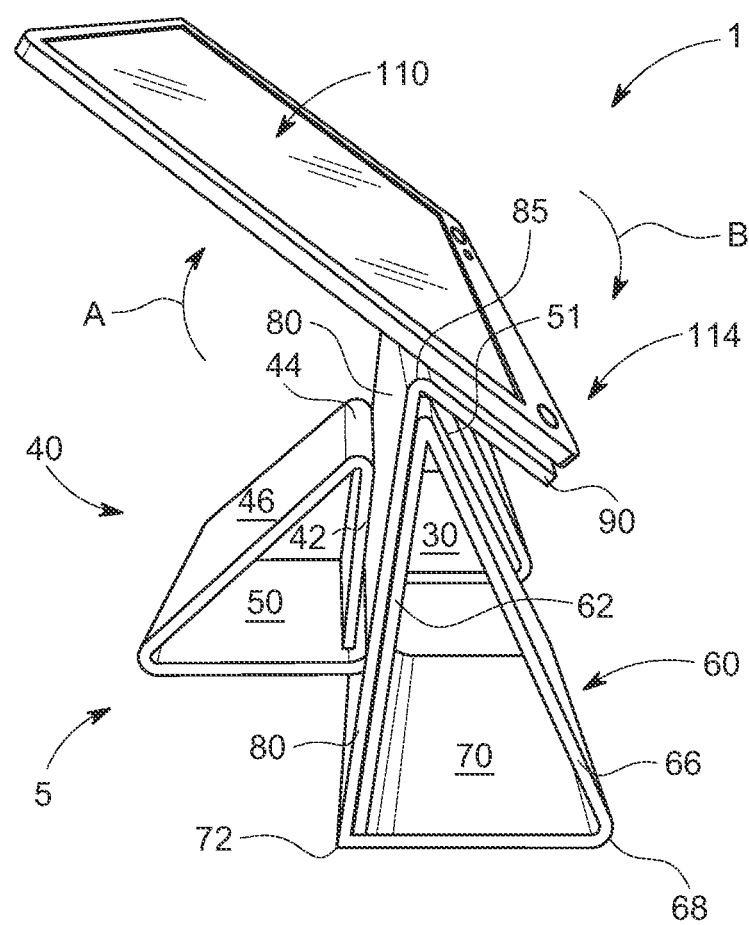
FIG. 20 is a perspective view of an illustrative embodiment of a side of a disassembled stand according to this disclosure.

FIGS. 14 through 20 depict assembly of the collapsible stand to support and exhibit an article. FIG. 14 is a perspective view of an illustrative embodiment of a side of a disassembled stand according to this disclosure. FIG. 15 is a perspective view of an illustrative embodiment of a top side of a disassembled stand according to this disclosure. FIG. 16 is a perspective view of an illustrative embodiment of a side of a disassembled stand according to this disclosure. FIG. 17 is a perspective view of an illustrative embodiment of a top side of a disassembled stand according to this disclosure. FIG. 18 is a perspective view of an illustrative embodiment of a side of a disassembled stand according to this disclosure. FIG. 19 is a perspective view of an illustrative embodiment of a side of a disassembled stand according to this disclosure. FIG. 20 is a perspective view of an illustrative embodiment of a side of a disassembled stand according to this disclosure.

As depicted in FIG. 14, in assembly of the stand to position first leg 40 of the stand to provide a rear leg 40, and second and third legs 20, 60 of the collapsible stand 5 to provide a forward leg 20, 60, the flap 41 (e.g., FIG. 8) is folded about hinge 68a from the plane of the single sheet of relatively stiff material to a position wherein the flap 41 is disposed on the back side of the apparatus 111 as depicted in FIG. 14. The second and third legs 20, 60 of the collapsible stand 5 are folded about hinge 68a from the plane of the single sheet of relatively stiff material to a position wherein second and third legs 20, 60 are disposed on the front side of the apparatus 111 as depicted in FIG. 14.

As depicted in FIGS. 15 and 16, the third panel 50 of the rear leg 40 of the single sheet of relatively stiff material is laid flat against the floor 6 on which the collapsible stand 5 is supported (see FIG. 16) to provide the floor support panel 50 of the collapsible stand 5, the floor support panel 50 hingedly connected to the footer panel 52 as previously explained.

As further depicted in FIGS. 16 and 17, the sixth panel 42 is folded inwardly toward the back side of the apparatus 111 so as to lie against the first panel 80 (i.e., the main body 80). The shelf support panel 42 provides backward support to the collapsible stand 5. The exterior support panel 46 provides the exterior support panel 46 of the collapsible stand 5. The shelf panel 44 provides the shelf panel of the collapsible stand 5.

FIGS. 18 and 19 depict the second and third legs 20, 60 folded towards the main body 80 in a fashion similar to the way the first leg 40 was assembled to the main body 80. FIG. 18 shows the second panel 32, the third panel 30 (i.e. floor support panel 30), the fourth panel 26 (i.e., the exterior support panel), the fifth panel 24 (i.e., the shelf panel), and the sixth panel 22 (i.e., the shelf support panel) of the second leg 20. The third leg 60 has panels like those shown in FIGS. 18 and 19 and bear the same numbers as the second leg 20 increased by 40.

FIG. 20 depicts the collapsible stand 5 with rear leg 40 and front legs 20, 60 assembled. To complete the assembly, apparatus 110 is rotated forward A so that a bottom portion of the apparatus 110 is rotated backward against the main body until a lower edge 114 of the apparatus 110 sits atop shelf panels 24, 66. The dimensions of the front legs 20, 60 may be configured so that the lower edge 114 of the apparatus 110 and shelf panels 24, 26 lie closely against each other in a tight fit. The fully assembled stand according to this disclosure are depicted in this disclosure in FIGS. 1 through 7.

FIGS. 21 through 28 illustrate the collapsible stand configured for covering an article after disassembly of the collapsible stand.

Figure 21:
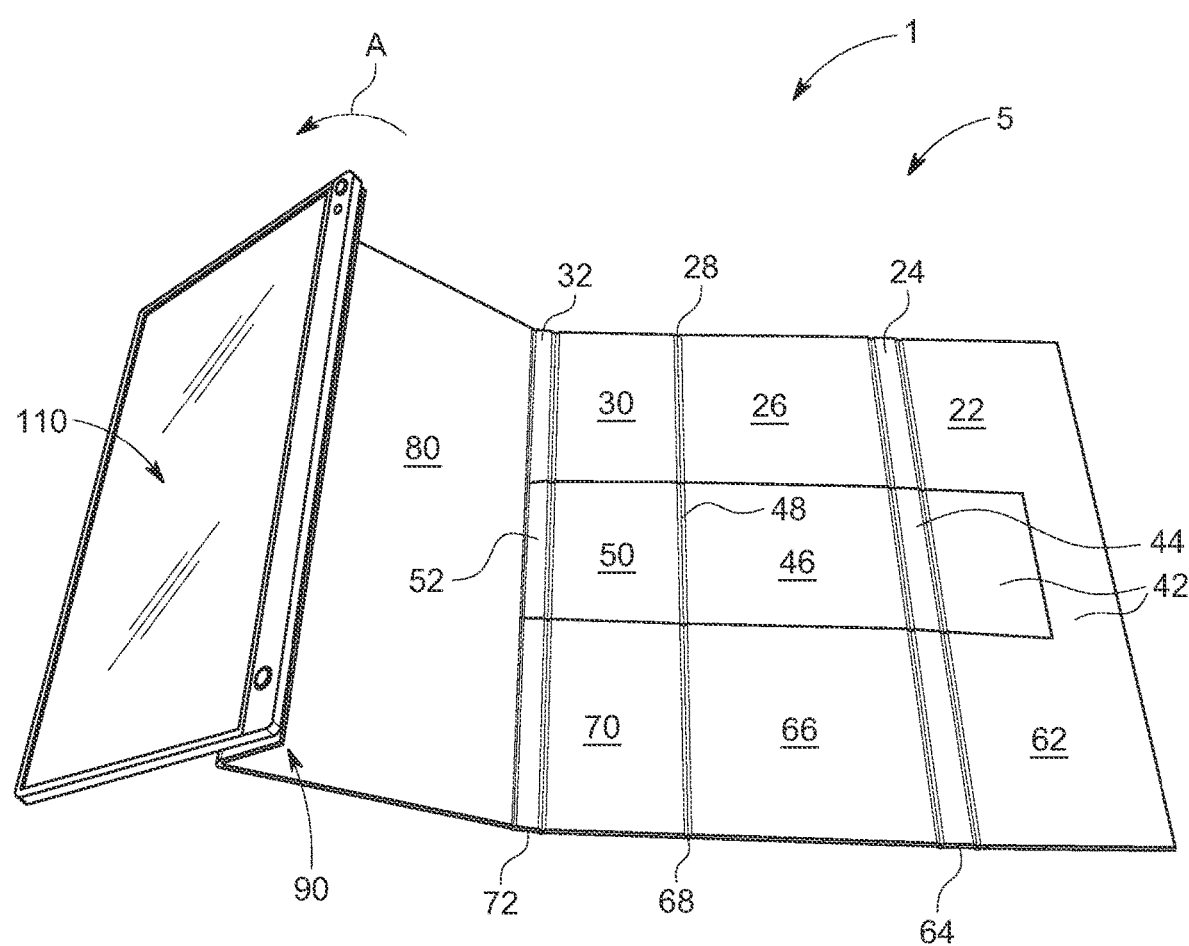
FIG. 21 is a perspective view of an alternative illustrative embodiment of a back side of a disassembled stand assemblying as a cover according to this disclosure.

FIG. 21 is a perspective view of an alternative illustrative embodiment of a back side of a disassembled stand assemblying as a cover according to this disclosure. FIG. 21 shows the detachment of seventh panel 90 from the body 80. As explained in connection with FIG. 9, the first and seventh panels are releasably attached by an attachment mechanism such as the pair of oppositely polarized magnets located on the first and seventh panels where the panels adjoin each other. FIG. 21 illustrates the detachment of the seventh panel 90 from the body 80.

Figure 22:
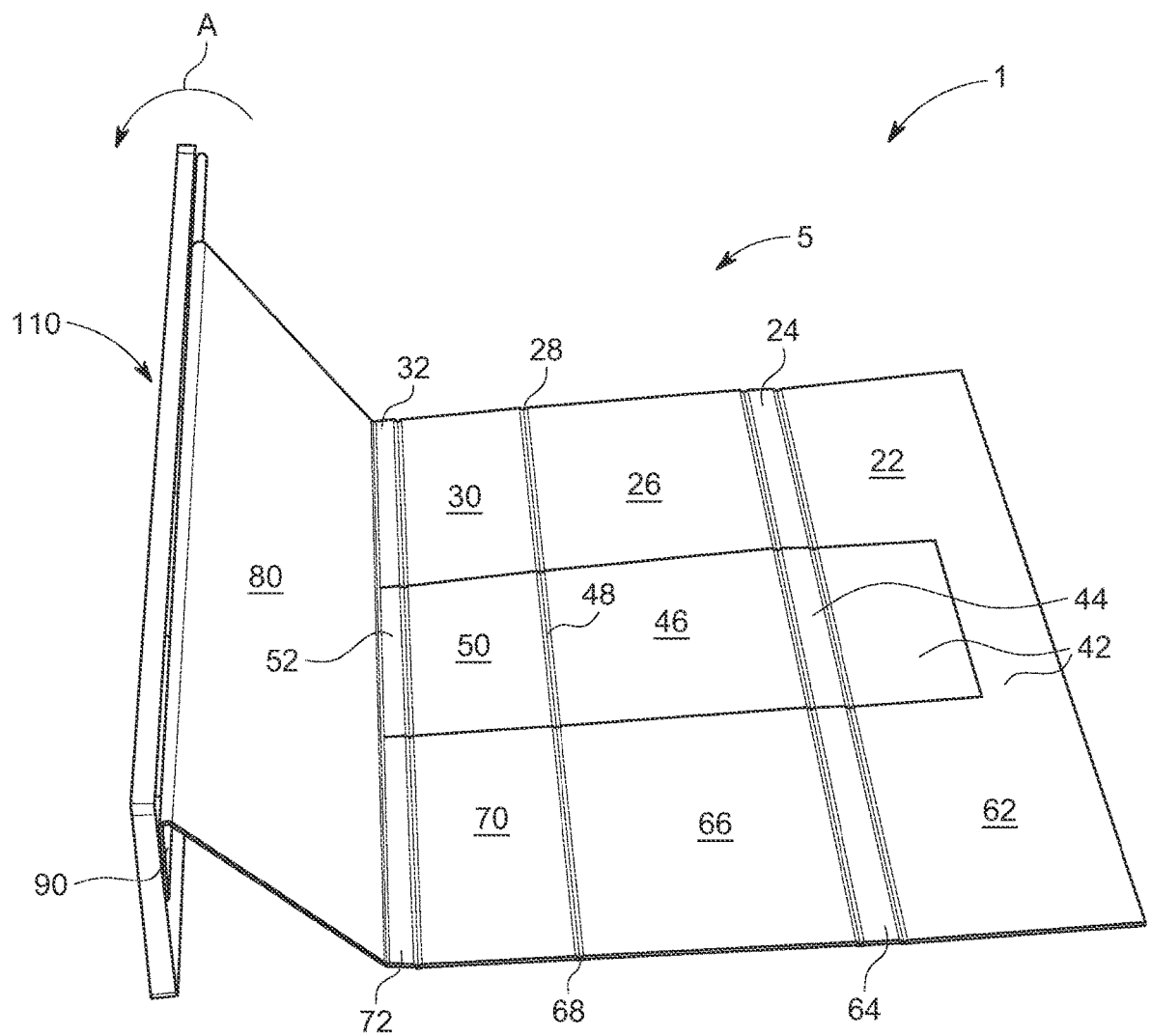
FIG. 22 is a perspective view of an illustrative embodiment of a back side disassembled stand assemblying as a cover according to this disclosure.

FIG. 22 is a perspective view of an illustrative embodiment of a back side of a disassembled stand assemblying as a cover according to this disclosure. FIG. 22 shows the article 110 rotated A about the main body 80.

Figure 23:
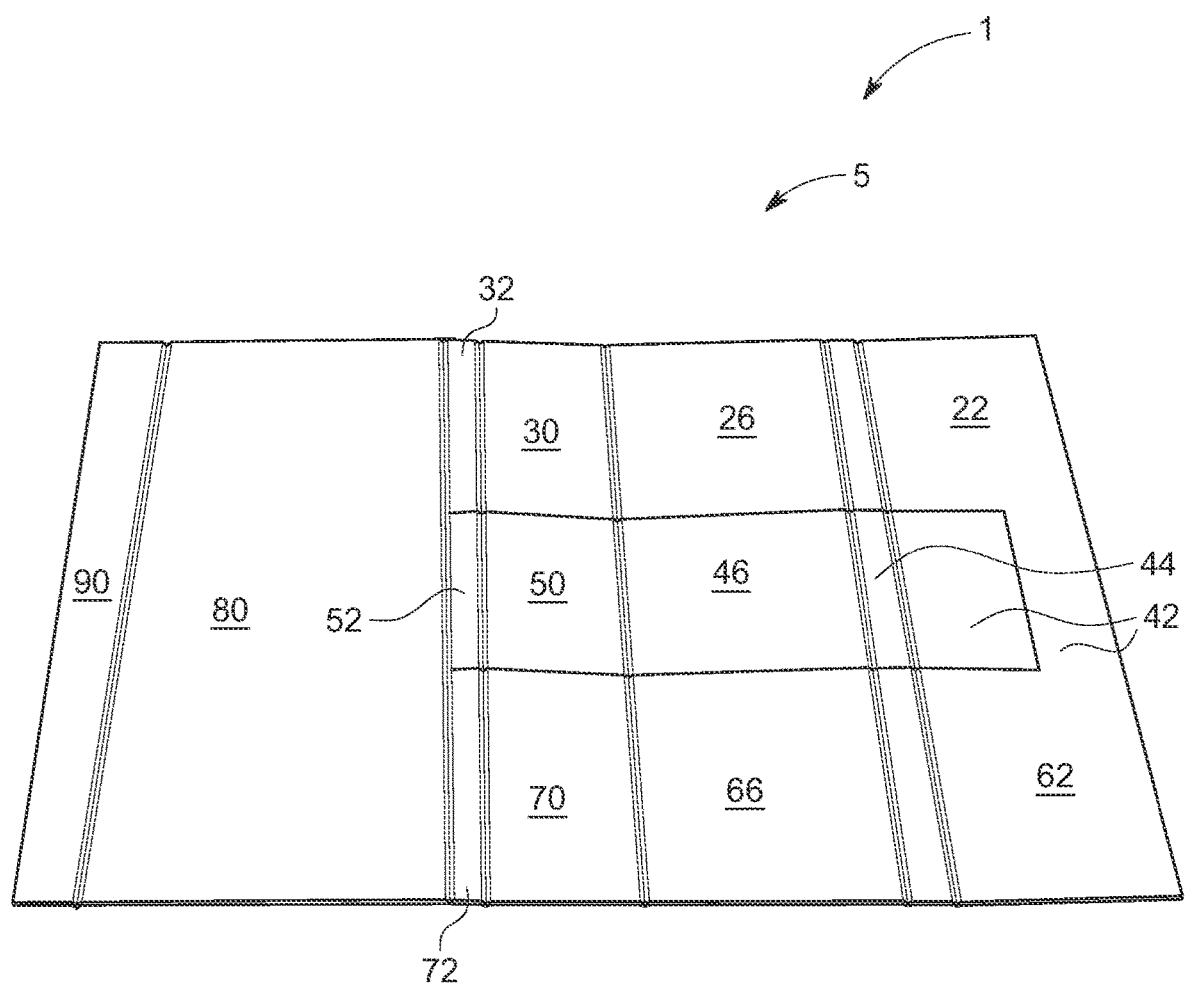
FIG. 23 is a perspective view of an illustrative embodiment of a back side of a disassembled stand assemblying as a cover according to this disclosure.

FIG. 23 is a perspective view of an illustrative embodiment of a back side of a disassembled stand assemblying as a cover according to this disclosure. FIG. 23 shows the rotated article 110 of FIG. 22 in a fully rotated position face down and lying parallel to the single sheet of relatively stiff material 5.

Figure 24:
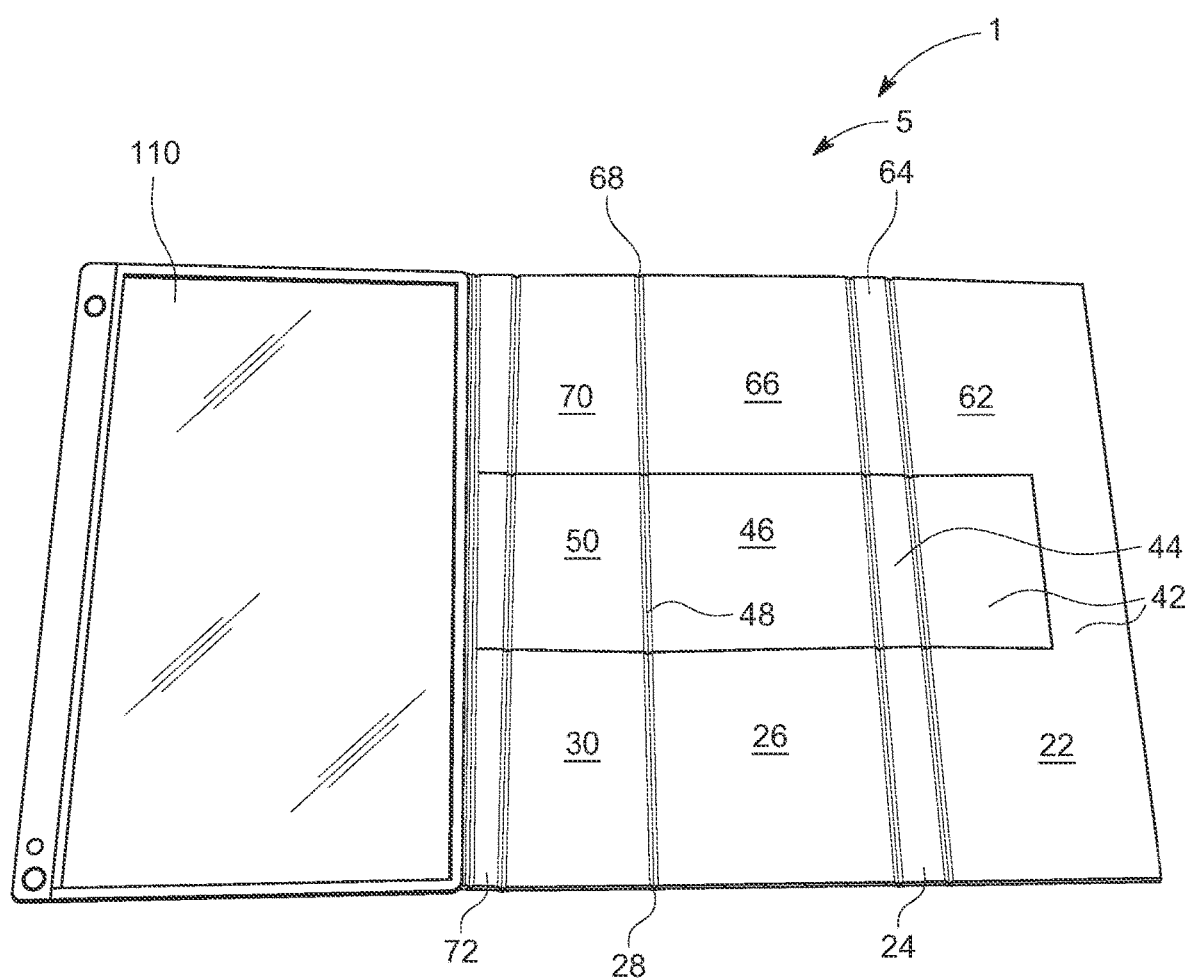
FIG. 24 is a perspective view of an illustrative embodiment of a front side of a disassembled stand assemblying as a cover according to this disclosure.

FIG. 24 is a perspective view of an illustrative embodiment of a front side of a disassembled stand assemblying as a cover according to this disclosure. FIG. 24 shows the depiction of FIG. 23 with the article 110 face-up.

Figure 25:
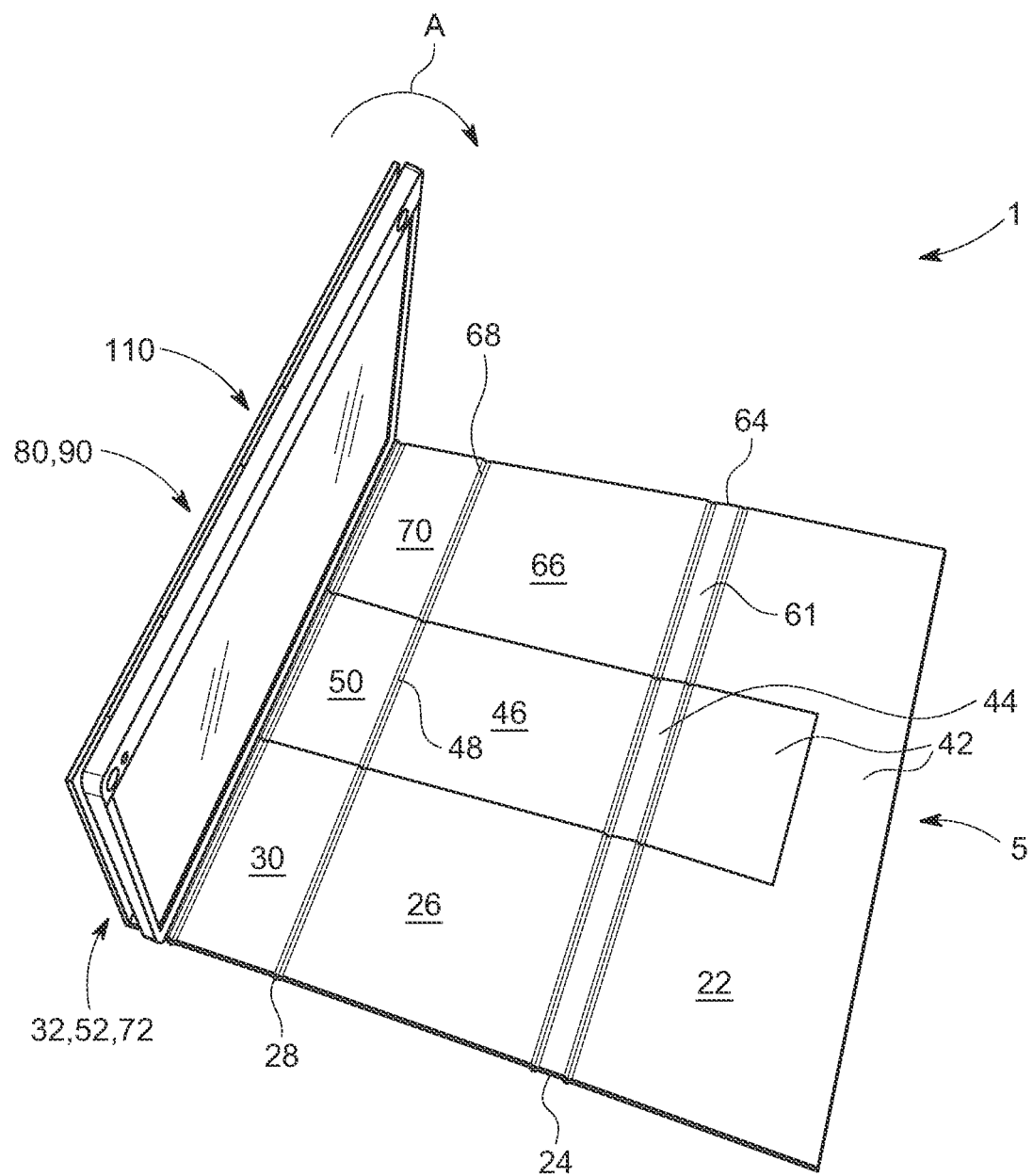
FIG. 25 is a perspective view of an illustrative embodiment of a front side of a disassembled stand assemblying as a cover according to this disclosure.

FIG. 25 is a perspective view of an illustrative embodiment of a front side of a disassembled stand assemblying as a cover according to this disclosure. FIG. 25 shows the article 110 with back side covered by first panel 80 and seventh panel 90, and bottom side against the second panel rotated inward A toward: third 30, 50, 60; fourth 26. 46. 66; fifth 24, 44, 66; and sixth panels 22, 42, 62.

Figure 26:
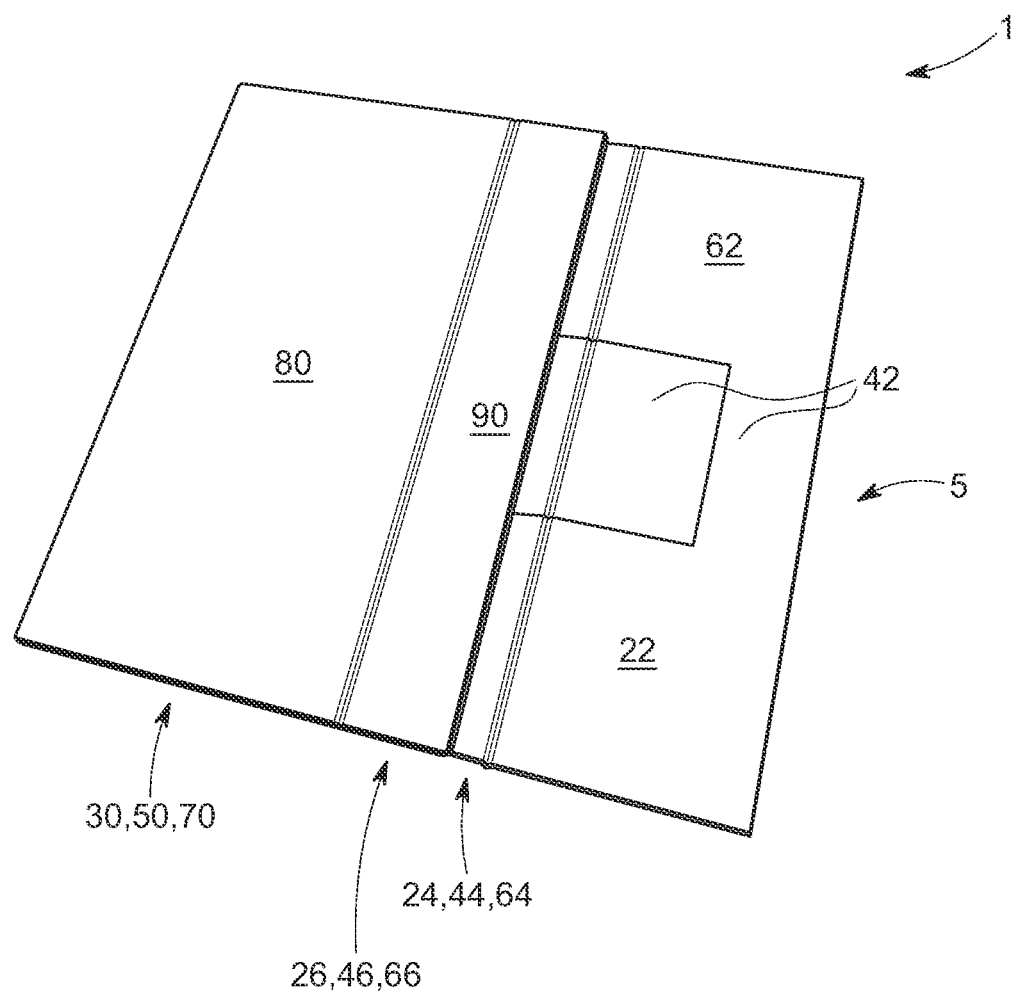
FIG. 26 is a perspective view of an illustrative embodiment of a front side of a disassembled stand assemblying as a cover according to this disclosure.

FIG. 26 is a perspective view of an illustrative embodiment of a front side of a disassembled stand assemblying as a cover according to this disclosure. FIG. 26 depicts the completed rotation of the article shown in FIG. 25 whereby the article lies against the third 30, 50, 60 and fourth 26. 46. 66 panels, the first 80 and seventh 90 panels lying against the article are depicted face-up. The fifth 24, 44, 66; and sixth panels 22, 42, 62 are depicted still unfolded. FIGS. 12 and 13 show the opposing magnets on the first 80 and sixth 22, 42, 62 panels that hold adjoining panels together.

Figure 27:
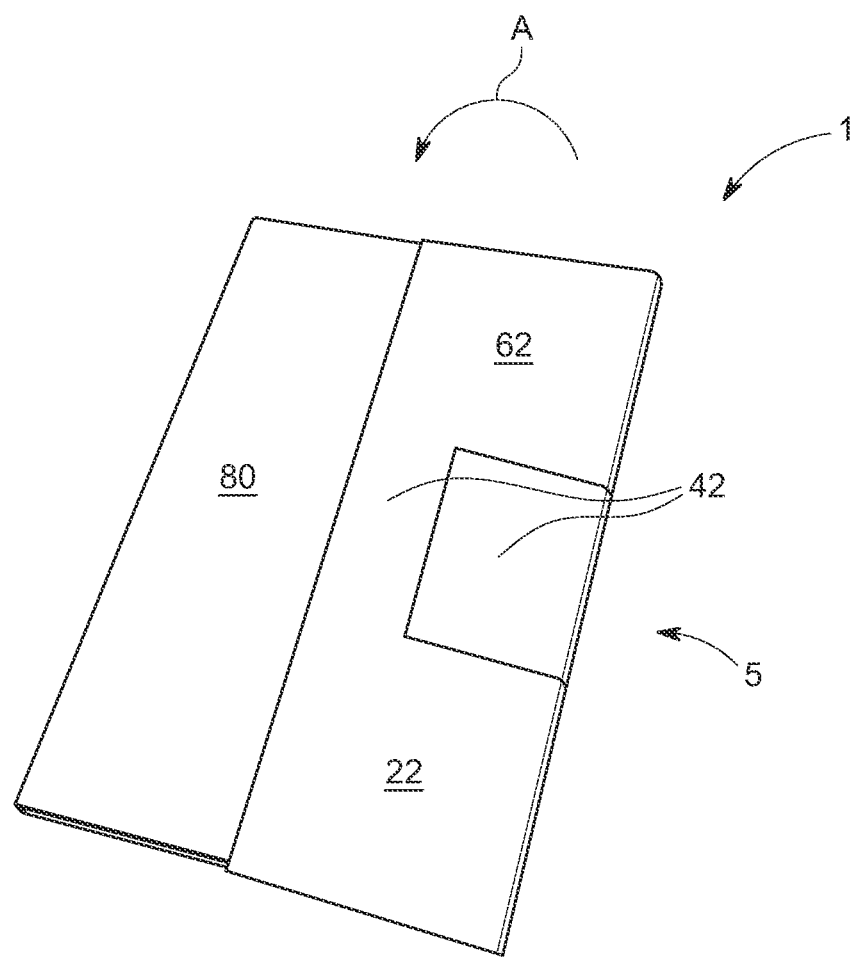
FIG. 27 is a perspective view of an illustrative embodiment of a front side of a disassembled stand assembled as a cover according to this disclosure.

FIG. 27 is a perspective view of an illustrative embodiment of a front side of a disassembled stand assembled as a cover according to this disclosure. FIG. 27 shows the fifth 24, 44, 66; and sixth panels 22, 42, 62 (see FIG. 26) depicted folded over the first and seventh panels 80, 90 to complete the covering of the article by the collapsible stand of this disclosure. As explained in connection with FIGS. 12 and 13, magnets on the first panel releasably attach to opposing magnets on the sixth panel to hold the cover together.

Figure 28:
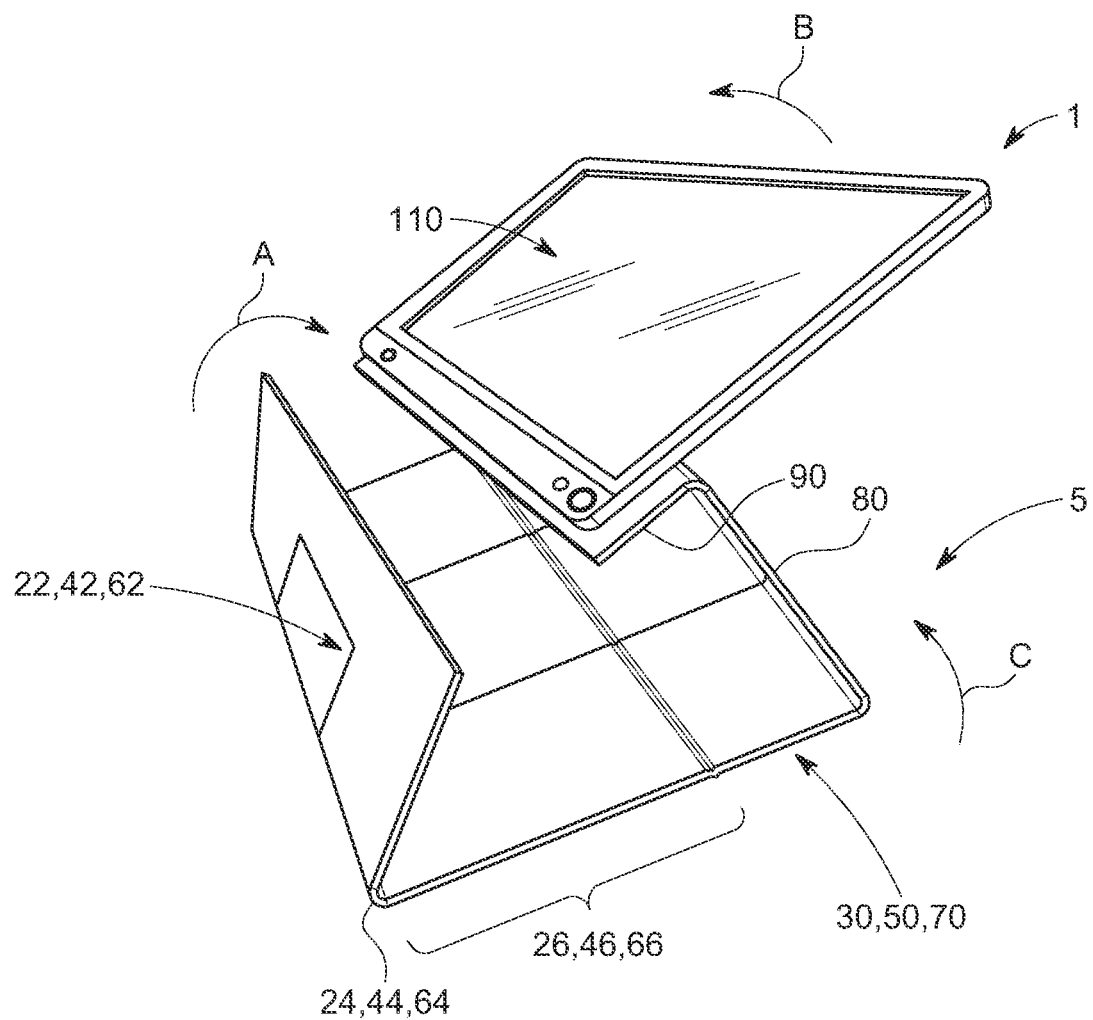
FIG. 28 is a front perspective view of an alternative illustrative embodiment of a front side of a disassembled stand according to this disclosure.

FIG. 28 is a front perspective view of an alternative illustrative embodiment of assembly of a stand according to this disclosure. FIG. 28 shows the article 110 with back side attached to the seventh panel 90. Shelf support panel (e.g., the sixth panels in FIGS. 8, 9) are rotated inwardly A toward exterior support panel (e.g., the fourth panels in FIGS. 8, 9) while article attachment panel 90 (e.g., the seventh panel in FIGS. 8, 9) is rotated inwardly B to bring the face of the article 110 more in line with the surface against which the collapsible stand 5 rests and the main body 80 (e.g., the first panel in FIGS. 8, 9) is rotated inwardly C toward exterior support panel (e.g., the fourth panels in FIGS. 8, 9 41).

Figure 29:
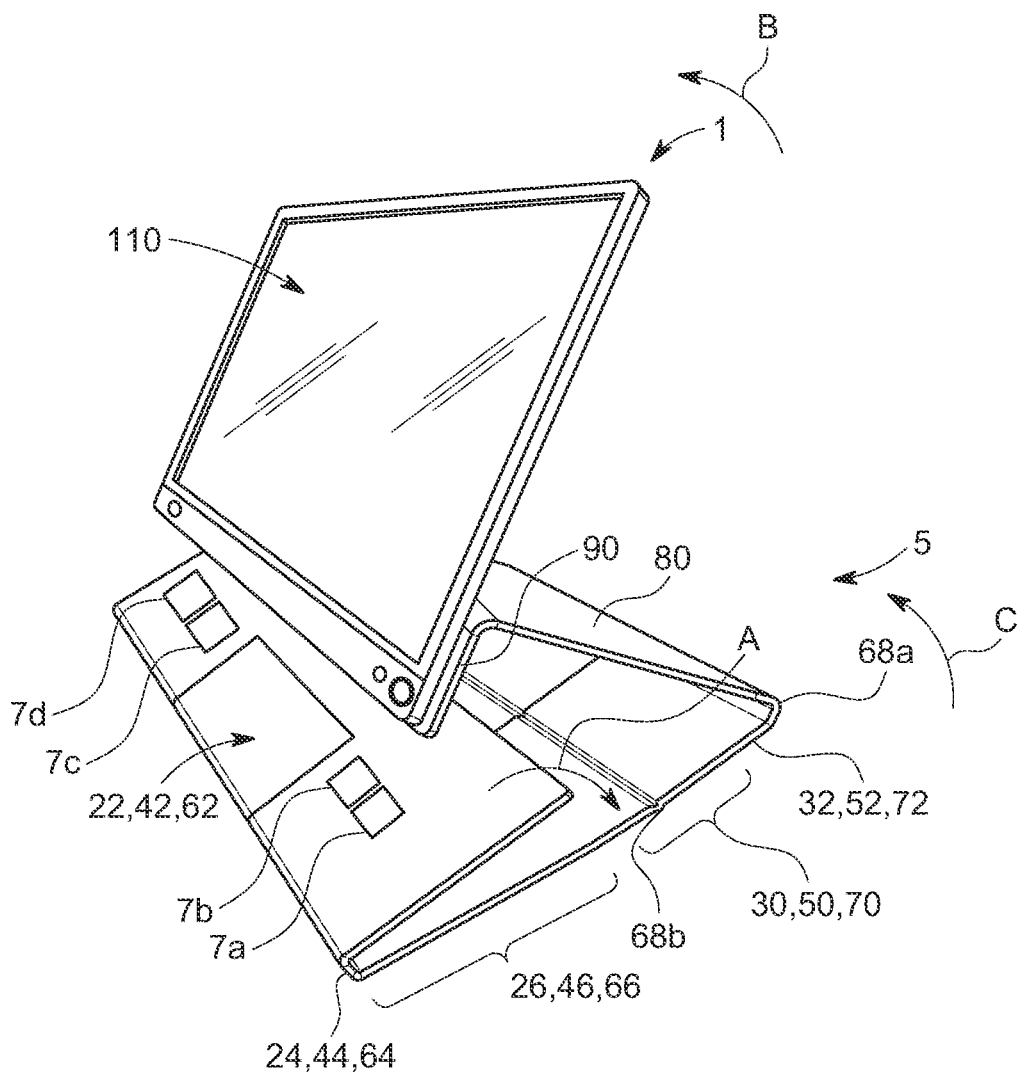
FIG. 29 is front perspective view of the alternative illustrative embodiment of this disclosure shown in FIG. 28 in a different position in the assembly.

FIG. 29 is front perspective view of the alternative illustrative embodiment of this disclosure shown in FIG. 28 in a different position in the assembly. FIG. 29 shows shelf support panel (e.g., the sixth panels in FIGS. 8, 9) rotated even further inwardly A toward exterior support panel (e.g., the fourth panels in FIGS. 8, 9) while article attachment panel 90 (e.g., the seventh panel in FIGS. 8, 9) is rotated even further inwardly B to bring the face of the article 110 even more in line with the surface against which the collapsible stand 5 rests and the main body 80 (e.g., the first panel in FIGS. 8, 9) is rotated even further inwardly C toward exterior support panel (e.g., the fourth panel in FIGS. 8, 9). Also shown in FIG. 29 are the four magnets 7a, 7b, 7c, 7d depicted in FIG. 12 for holding adjacent panels of the cover together.

Figure 30:
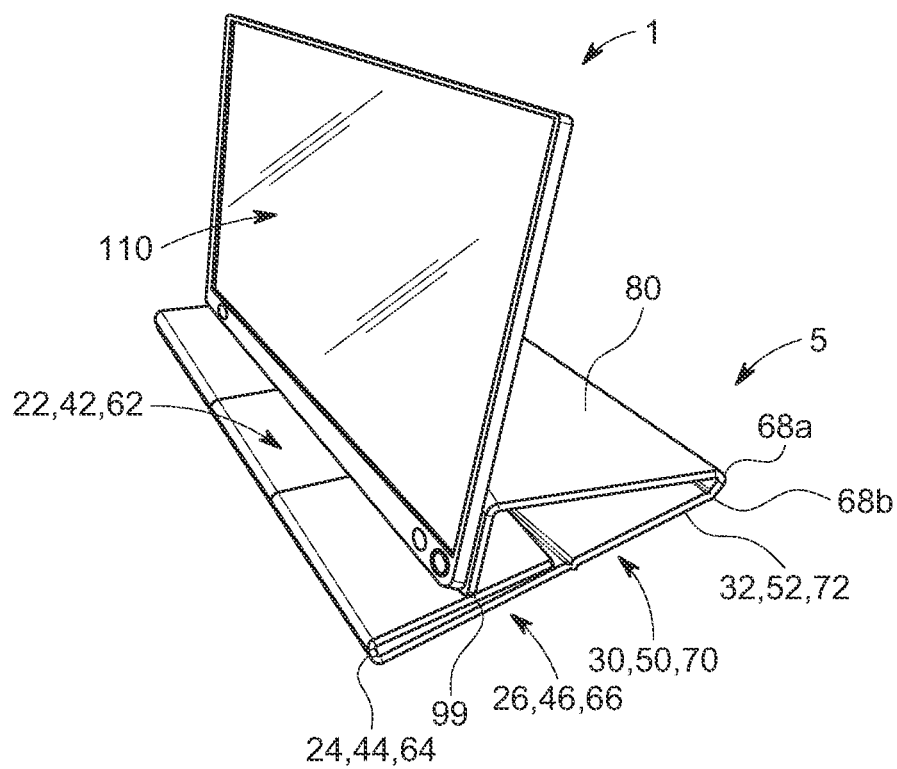
FIG. 30 is a perspective view of the alternative illustrative embodiment of this disclosure shown in FIG. 28 in an assembled position.

FIG. 30 is a perspective view of the alternative illustrative embodiment of this disclosure shown in FIG. 28 in an assembled position. FIG. 30 depicts the completed assembly of the article according to this embodiment whereby shelf support panel (e.g., the sixth panels in FIGS. 8, 9) lies against exterior support panel (e.g., the fourth panels in FIGS. 8, 9) and a top edge 99 of the article attachment panel 90 (e.g., the seventh panel in FIGS. 8, 9) is seated against a surface of shelf support panels 22, 42, 62 (e.g., the sixth panels in FIGS. 8, 9). The main body 80 (e.g., the first panel in FIGS. 8, 9) provides the exterior support panel; projecting from the floor to the article attachment panel 90 (e.g., the seventh panel in FIGS. 8, 9) to resist the opposing force created by the load of the article supported by the collapsible stand.

Figure 31:
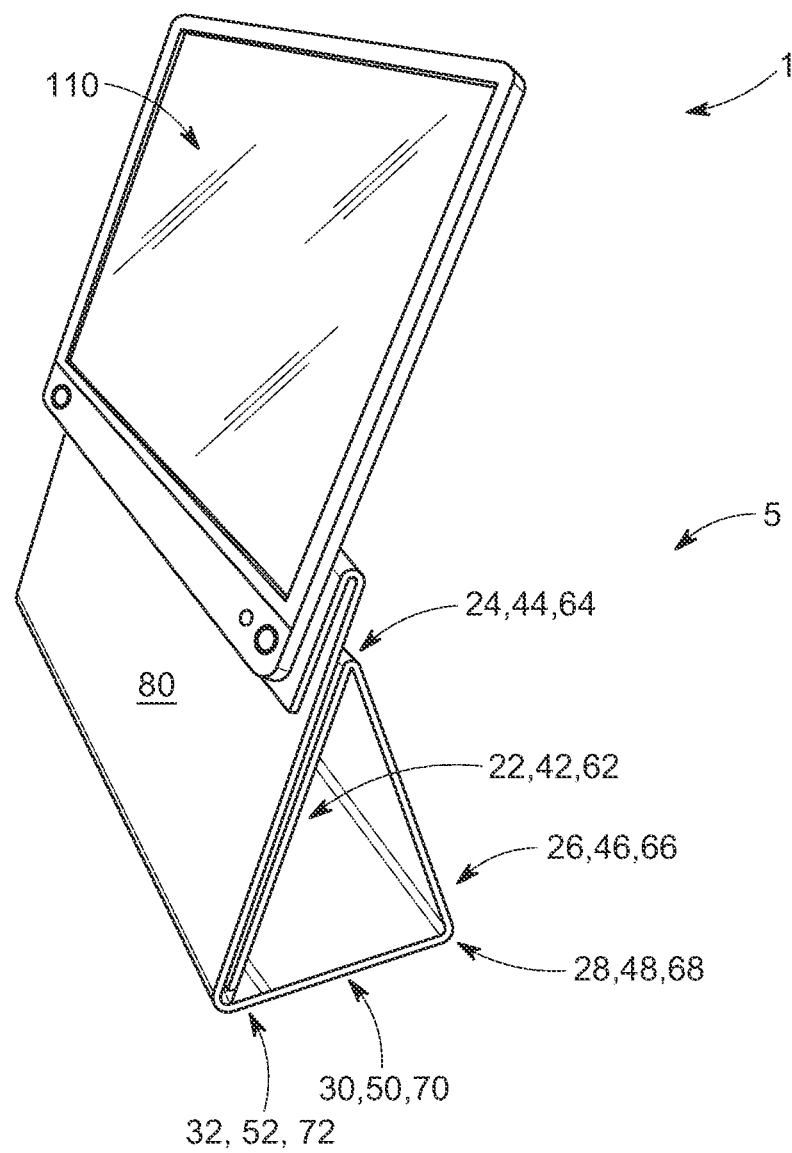
FIG. 31 is front perspective view of an alternative illustrative embodiment of assembly of a stand according to this disclosure.

FIG. 31 is front perspective view of an alternative illustrative embodiment of assembly of a stand according to this disclosure. FIG. 31 shows the single sheet of relatively stiff material depicted in FIG. 8 without the flap 41 cut out along a longitudinal mid-section of the sheet. Thus, this embodiment is disclosed without three legs. Rather, in this embodiment, when the panels of the sheet are folded so that the panels are positioned behind the article, the shelf support panel (e.g., the sixth panels in FIGS. 8, 9 without the flap 41) lies against the main body 80 (e.g., the first panel in FIGS. 8, 9 without the flap 41). The floor support panel (e.g., the third panels in FIGS. 8, 9 without the flap 41) lies against the floor on which the collapsible stand 5 rests. The exterior support panel (e.g., the fourth panels in FIGS. 8, 9 without the flap 41) projects from the floor to the main body to resist the opposing force created by the load of the article supported by the collapsible stand.

Figure 32:
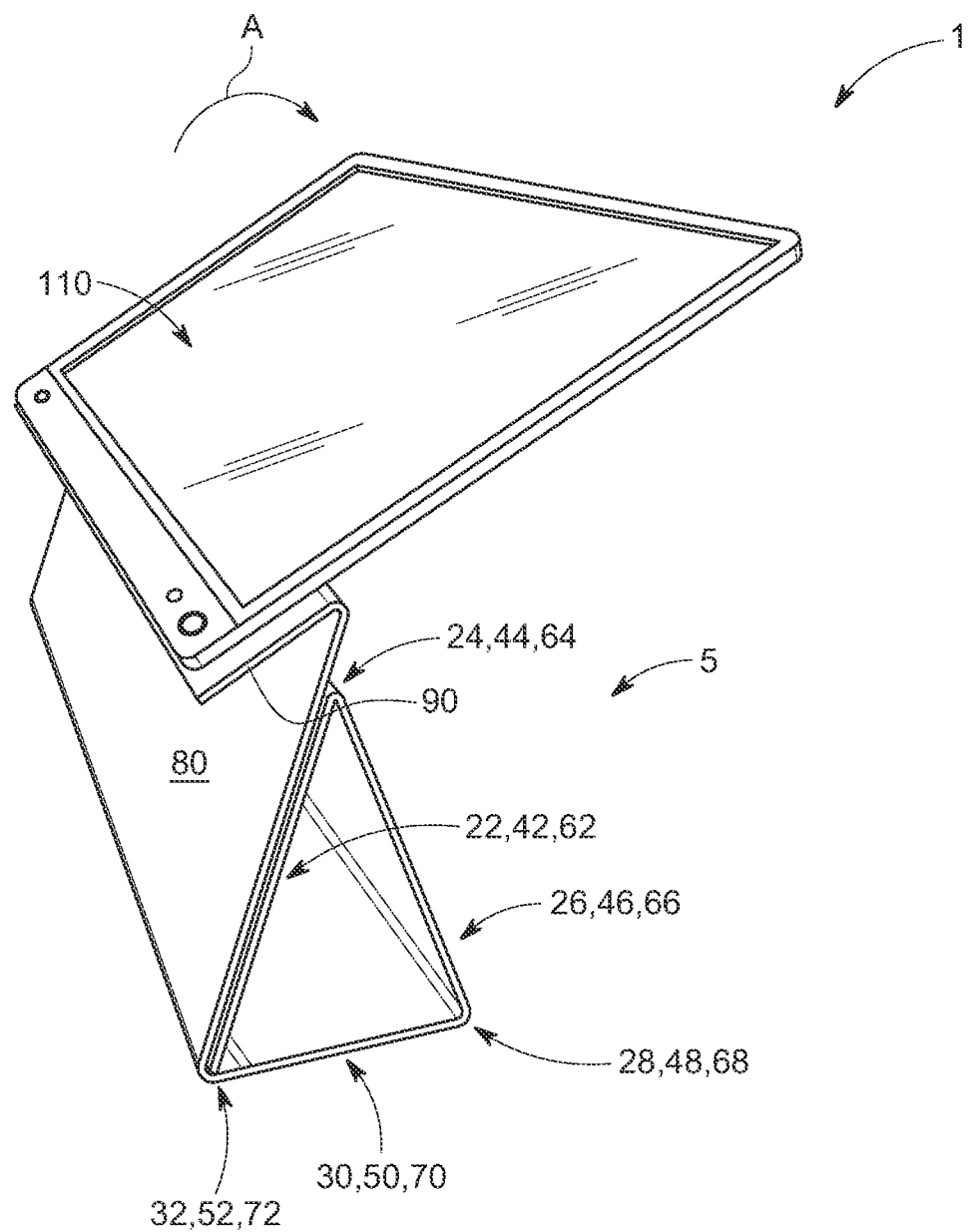
FIG. 32 is front perspective view of the alternative illustrative embodiment of this disclosure shown in FIG. 31 in a different position in the assembly.

FIG. 32 is front perspective view of the alternative illustrative embodiment of this disclosure shown in FIG. 31 in a different position in the assembly. In FIG. 32, the article attachment panel (e.g., the seventh panel in FIGS. 8, 9 without the flap 41) is rotated A to tilt the top 113 of the article 110 toward the surface against which the collapsible stand 5 rests.

Figure 33:
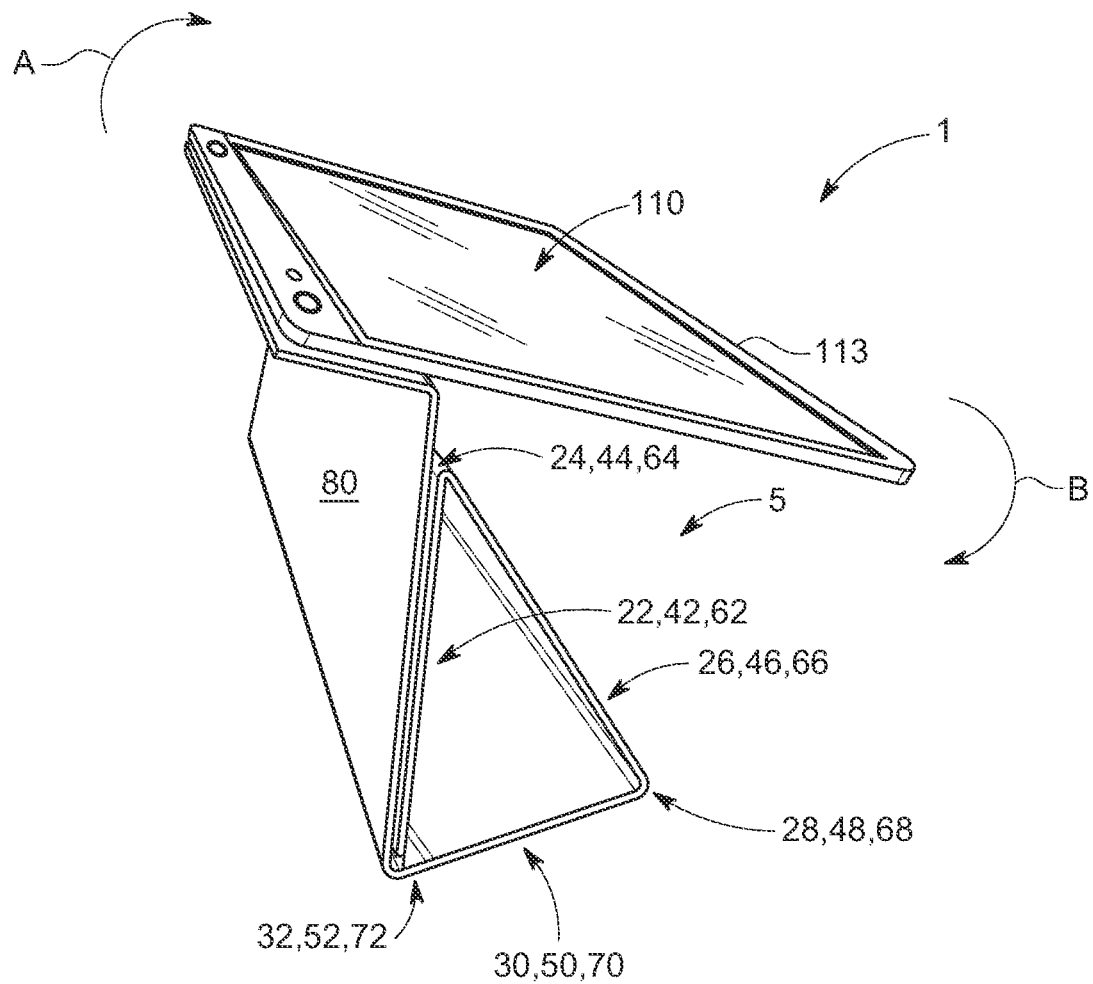
FIG. 33 is front perspective view of the alternative illustrative embodiment of this disclosure shown in FIG. 31 in a different position in the assembly.

FIG. 33 is front perspective view of the alternative illustrative embodiment of this disclosure shown in FIG. 31 in a different position in the assembly. In FIG. 33, the article attachment panel (e.g., the seventh panel in FIGS. 8, 9 without the flap 41) is even further rotated A to tilt the face of the article 110 so that the top of the article is facing in a downwardly direction with respect to the surface against which the collapsible stand 5 rests.

Figure 34:
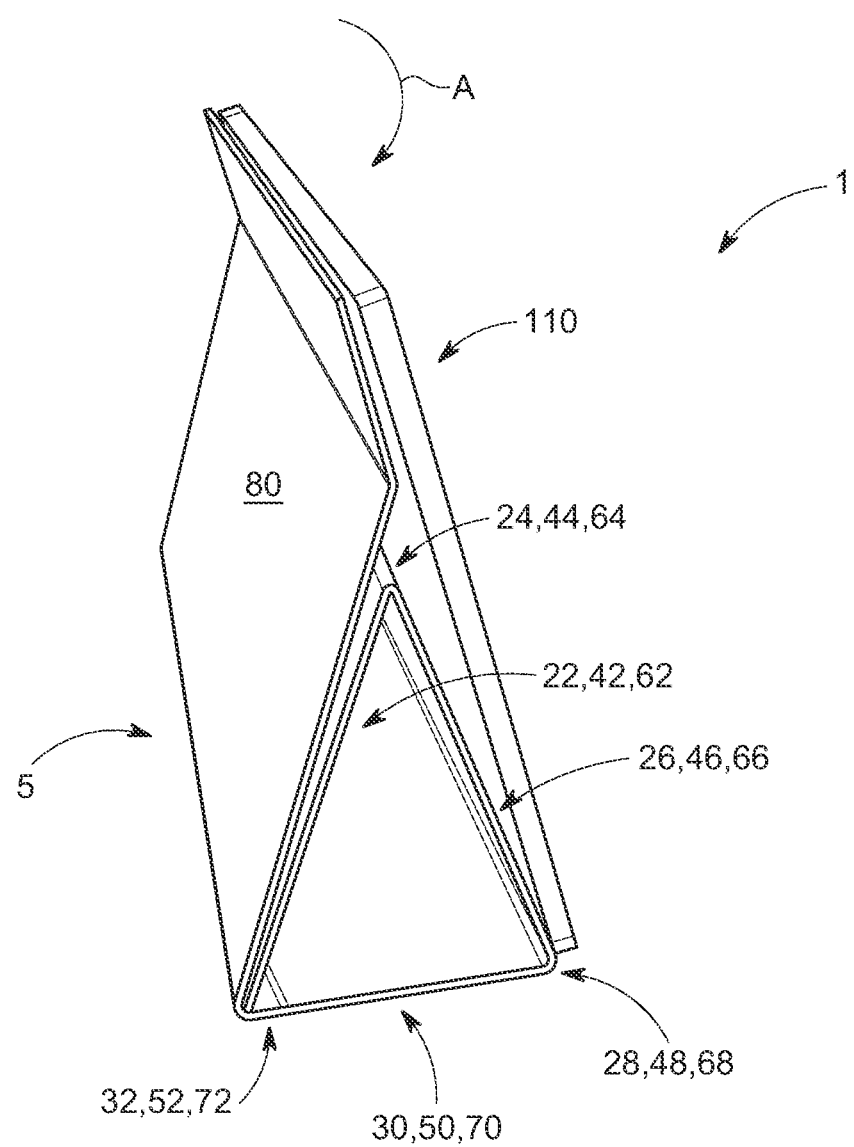
FIG. 34 is a perspective view of the alternative illustrative embodiment of this disclosure shown in FIG. 31 in a different position in the assembly.

FIG. 34 is a perspective view of the alternative illustrative embodiment of this disclosure shown in FIG. 31 whereby the article attachment panel (e.g., the seventh panel in FIGS. 8, 9 without the flap 41) is even further rotated A so that the article 110 leans against the exterior support panel (e.g., the fourth panel in FIGS. 8, 9 without the flap 41) of the collapsible stand 5. The article 110 is upside down in this depiction.

Figure 35:
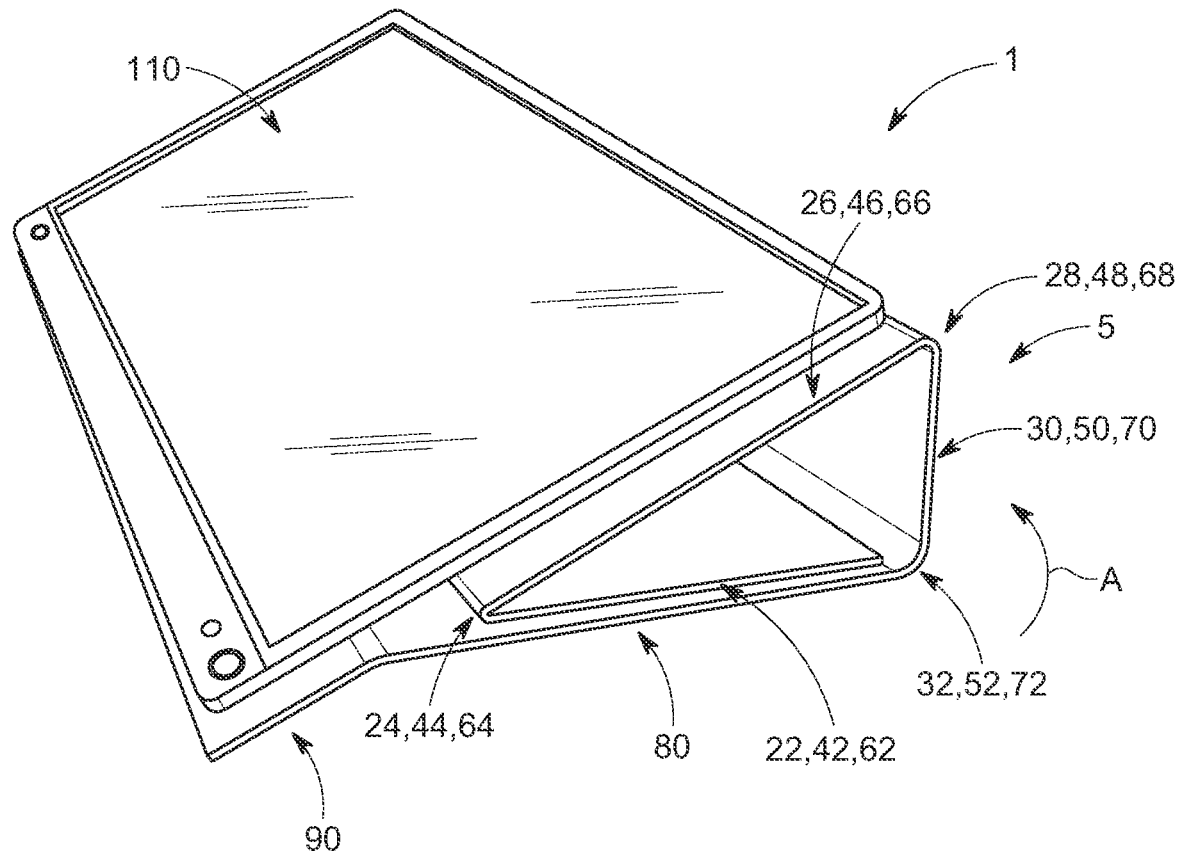
FIG. 35 is front perspective view of the alternative illustrative embodiment of this disclosure shown in FIG. 31 in an assembled position.

FIG. 35 is front perspective view of the alternative illustrative embodiment of this disclosure shown in FIG. 31 in an assembled position. FIG. 35 shows the collapsible stand 5 rotated A to bring the article 110 right side up. The main body 80 (e.g., the first panel in FIGS. 8, 9 without the flap 41) provides the floor support panel in this embodiment. As previously described, the article 110 leans against the exterior support panel (e.g., the fourth panel in FIGS. 8, 9 without the flap 41) of the collapsible stand 5. The floor support panel (e.g., the third panel in FIGS. 8, 9 without the flap 41) provides a load bearing panel to resist the opposing force created by the load of the article supported by the collapsible stand.

Figure 36:
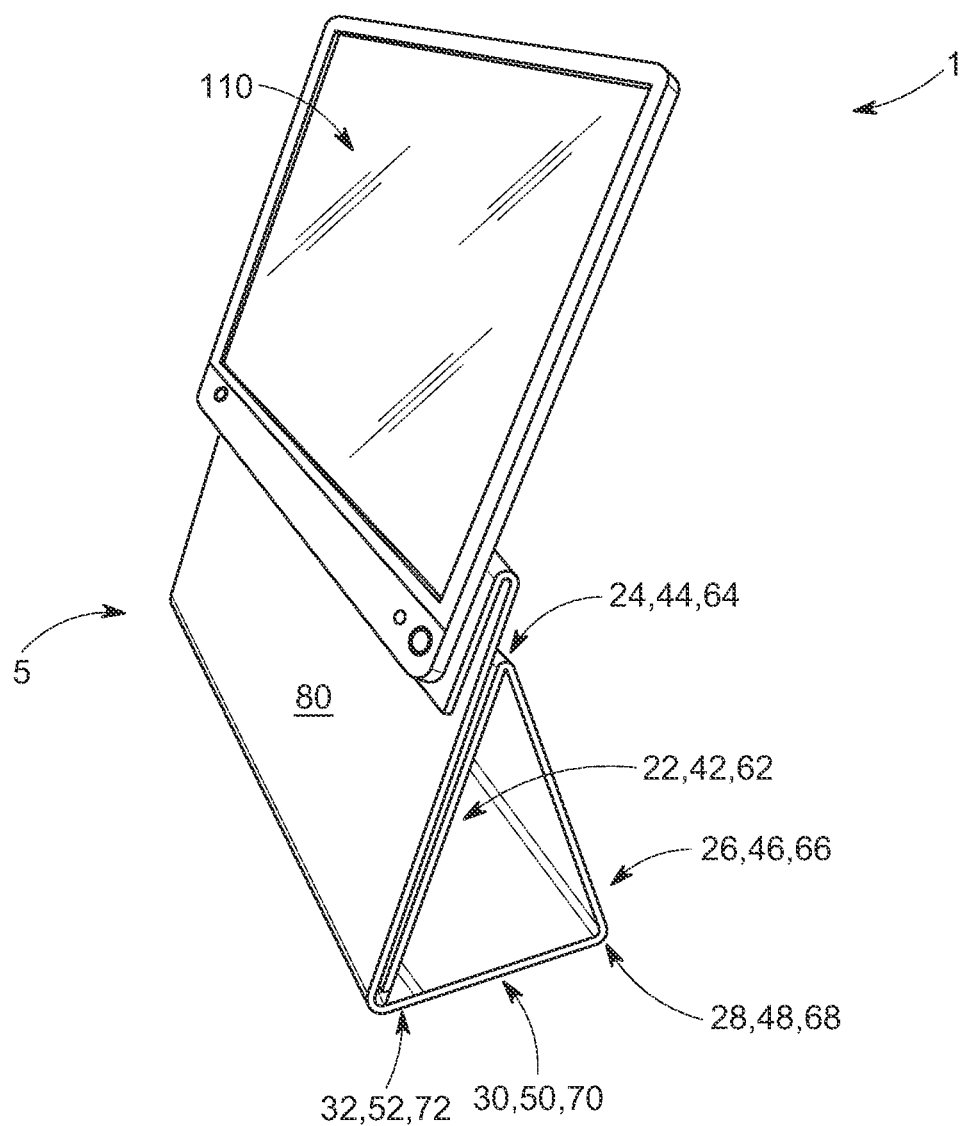
FIG. 36 is front perspective view of an alternative illustrative embodiment of assembly of a stand according to this disclosure.

FIG. 36 is front perspective view of an alternative illustrative embodiment of assembly of a stand according to this disclosure. FIG. 36 shows the single sheet of relatively stiff material depicted in FIG. 8 without the flap 41 cut out along a longitudinal mid-section of the sheet. Thus, this embodiment is disclosed without three legs. Rather, in this embodiment, when the panels of the sheet are folded so that the panels are positioned behind the article, the shelf support panel (e.g., the sixth panels in FIGS. 8, 9 without the flap 41) lies against the main body 80 (e.g., the first panel in FIGS. 8, 9 without the flap 41). The floor support panel (e.g., the third panels in FIGS. 8, 9 without the flap 41) lies against the floor on which the lies against the floor on which the collapsible stand 5 rests. The article attachment panel (e.g., the seventh panel in FIGS. 8, 9 without the flap 41) holds article 110 against the main body (e.g., the first panel in FIGS. 8, 9 without the flap 41). The exterior support panel (e.g., the fourth panels in FIGS. 8, 9 without the flap 41) projects from the floor to the main body to resist the opposing force created by the load of the article supported by the collapsible stand.

Figure 37:
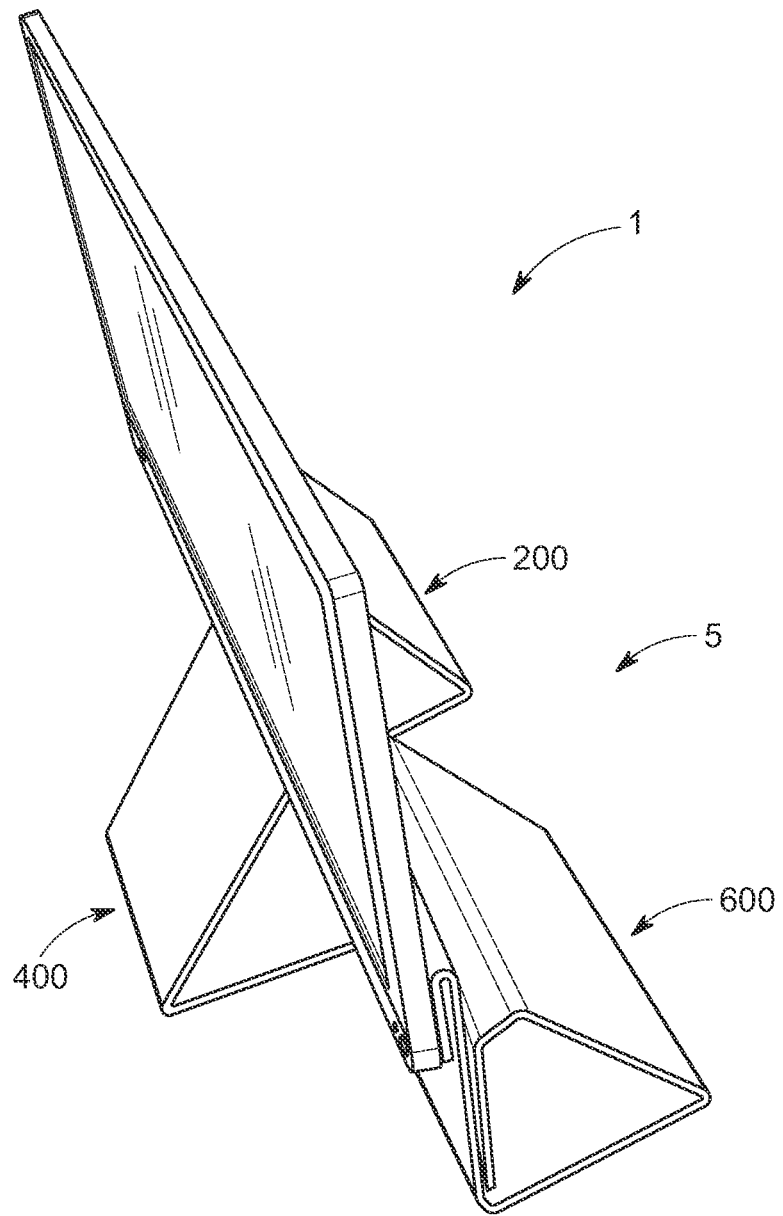
FIG. 37 is a front perspective view of an alternative illustrative embodiment of assembly of a stand according to this disclosure.

FIG. 37 is a front perspective view of an alternative illustrative embodiment of assembly of a stand according to this disclosure. The at least three legs of the tripod of this disclosure may be configured so that the pair of legs 200, 600 are standing behind the article with the at least single leg 400 is standing in front of the article. As explained in connection with FIG. 9, a portion of the sheet along transverse side 57 of the end of the flap cutout 51 may be configured to form a transverse support structure 43 between the two forward legs 20, 60. The transverse support structure 43 makes the single "middle" leg shorter than the pair of "outer" legs. In the embodiments disclosed prior to the embodiment of FIGS. 1-7, the single, shorter "middle" leg stood behind the article to cause the main body 80 and the article 110 lying thereagainst to incline backwardly so that the face of the article is oriented in a somewhat upwardly direction with respect to the direction of the surface against which the collapsible stand 5 rests. In the embodiment of FIG. 37, the single, shorter "middle" leg standing in front of the article causes the incline of the face of the article to be oriented in a somewhat downwardly direction with respect to the direction of the surface against which the collapsible stand 5 rests. This may be desirable in some cases, such as when a user is so positioned as to be looking slightly or otherwise up at the face of the article.

It will be appreciated from this disclosure that the transverse support structure 43 is a design parameter that factors into the amount of incline the face of the article may take with respect to the surface against which the collapsible stand 5 rests and so provides a variable that allows the transverse support structure 43 to be dimensioned to provide the desired incline. Alternatively, the transverse support structure 43 may be removed all together which would cause the "middle" leg standing in front of the article to be the same length as the pair of "outer" legs standing behind the article in forming the tripod of this embodiment.

Figure 38:
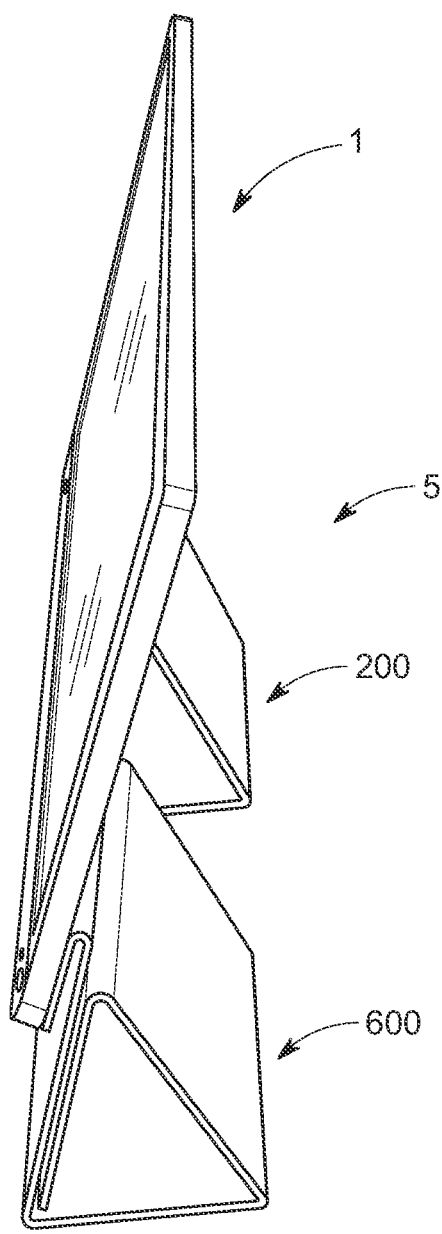
FIG. 38 depicts a back perspective view of an alternative illustrative embodiment assembled stand according to this disclosure.

FIG. 38 depicts a back perspective view of an alternative illustrative embodiment assembled stand according to this disclosure. In this embodiment, only the pair of the at least three legs of the tripod previously disclosed are used and they are configured so that the pair of legs 200, 600 are standing behind the article. There is no single leg 40 (FIGS. 1-7) standing in front of the article in this embodiment. The single sheet of relatively stiff material may be configured without forward leg 40 and without the transverse support structure 43 in this embodiment.

FIG. 39 depicts an illustrative method for covering an article after disassembly of the collapsible stand. The method includes the step 210 of configuring panels of a disassembled collapsible stand formed from a single sheet of relatively stiff material to lie planar to each other, the panels including: a first panel of the plural-panel and shelf structure configured to provide a main body of the collapsible stand; a second panel of the single sheet of relatively stiff material configured to provide a footer panel of the collapsible stand, the footer panel hingedly connected to the first panel; a third panel of the single sheet of relatively stiff material configured to provide the floor support panel of the collapsible stand, the floor support panel hingedly connected to the footer panel; a fourth panel of the single sheet of relatively stiff material configured to provide the exterior support panel of the collapsible stand, the exterior support panel hingedly connected to the floor support panel; a fifth panel of the single sheet of relatively stiff material configured to provide the shelf panel of the collapsible stand, the shelf panel hingedly connected to the fourth panel; a sixth panel of the single sheet of relatively stiff material configured to provide the shelf support panel of the collapsible stand, the shelf support panel hingedly connected to the fifth panel; a seventh panel of the single sheet of relatively stiff material configured to provide an article attachment panel of the collapsible stand, the article attachment panel hingedly connected and releasably attached to the sixth panel; the step 220 of detaching the seventh panel from the first panel; the step 230 of rotating the seventh panel with article facing upwardly about the hinged connection so that the article lies face down against the first and the seventh panels; the step 240 of turning the single sheet of relatively stiff material over so that the article lies face up from the first and the seventh panels; (e) the step 250 of rotating the first panel with article about the hinged connection toward the third, fourth, fifth, and sixth panels so that the article lies face down against the third and fourth panels; and (f) the step 260 of rotating the sixth panel toward the third, fourth, and fifth panels so that the sixth panel covers at least a portion of the first panel.

The single sheet of relatively stiff material cover may be made from any suitable material with sufficient stiffness to provide the support of the article as herein disclosed and is a matter of design choice. Illustrative materials that may be used include polyethylene (PE), polyurethane (PU), or other plastic material; a fabric, such as microfiber; leather; or cardboard; or any combination of two or more of any of these materials configured with sufficient stiffness to support the article. In an embodiment, the material may be any material that may be bonded. In another embodiment, the single sheet of relatively stiff material may be formed of or comprise a rigid sheet. The single sheet of relatively stiff material may be made mainly of a suitably rigid material, e.g. glass fiber; a metal, such as steel; a ferromagnetic metal; polystyrene (PS); carbon fiber reinforced composite; or cardboard. The single sheet of relatively stiff material may be enclosed by a surface material, such as polyethylene (PE), polyurethane (PU), or other plastic material, a fabric, such as microfiber, or leather.

While this disclosure has been described in connection with specific embodiments, it is evident that numerous alternatives, modifications, and variations will be apparent to those skilled in the art within the spirit and scope of the above disclosure.

What is claimed is:

1. A collapsible stand configured in an assembled position to support and exhibit an article comprising:
    a stand portion including two forward legs and a rear leg;
    the legs configured to support a lower portion of a main body;
    the legs splaying outwardly in the form of a tripod;
    the main body configured to provide a support against which the article rests in leaning engagement;
    the legs each comprising:
        a floor support panel hingeably connected to the main body, the floor support panel configured to lie against a floor,
        an exterior support panel hingeably connected to the floor support panel, the exterior support panel configured to project from the floor toward the main body to resist the opposing force created by the load of an article supported by the collapsible stand;
        a shelf panel hingeably connected to the exterior support panel, wherein the shelf panel of each of the two forward legs are configured to support the load of the article supported by the collapsible stand;
        a shelf support panel hingeably connected to the shelf panel configured to support the shelf panel against the main body.

2. The collapsible stand of claim 1, wherein in a disassembled position, the legs and main body collapse into a single sheet of relatively stiff material, the sheet weakened along a plurality of transverse parallel lines to provide a plurality of panels connected in hinged relation at their contiguous edges to provide the legs and main body in the assembled position.

3. The collapsible stand of claim 2, wherein the single sheet of relatively stiff material includes a flap cut along a longitudinal mid-section of the sheet, the flap connected along one side in hinged relation to the single sheet, the flap configured to form the rear leg of the stand.

4. The collapsible stand of claim 3, wherein a portion of the single sheet of relatively stiff material along a first longitudinal side of the flap is configured to form a first of the two forward legs.

5. The collapsible stand of claim 4, wherein a portion of the single sheet of relatively stiff material along a second longitudinal side of the flap is configured to form a second of the two forward legs.

6. The collapsible stand of claim 5, wherein a portion of the sheet along a transverse side of the end of the flap is configured to form a transverse support structure between the second of the two forward legs.

7. The collapsible stand of claim 6, wherein the plurality of panels comprises a first panel of the single sheet of relatively stiff material, the first panel is configured to provide the main body of the collapsible stand.

8. The collapsible stand of claim 7, wherein the plurality of panels comprises a second panel of the single sheet of relatively stiff material, the second panel is configured to provide a footer panel of the collapsible stand, the footer panel hingedly connected to the first panel.

\* \* \* \* \*